(12) United States Patent
Yu et al.

(10) Patent No.: US 12,259,625 B2
(45) Date of Patent: Mar. 25, 2025

(54) LIGHTING DEVICE AND VEHICLE LAMP HAVING SAME

(71) Applicant: LG INNOTEK CO., LTD., Seoul (KR)

(72) Inventors: Yeong Seok Yu, Seoul (KR); Do Yub Kim, Seoul (KR); Se Yeon Choi, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/768,203

(22) Filed: Jul. 10, 2024

(65) Prior Publication Data

US 2024/0361659 A1 Oct. 31, 2024

Related U.S. Application Data

(63) Continuation of application No. 18/539,538, filed on Dec. 14, 2023, now Pat. No. 12,066,732, which is a
(Continued)

(30) Foreign Application Priority Data

Aug. 11, 2020 (KR) .................. 10-2020-0100399

(51) Int. Cl.
*G02F 1/137* (2006.01)
*G02F 1/1335* (2006.01)
*G02F 1/135* (2006.01)

(52) U.S. Cl.
CPC .... *G02F 1/13718* (2013.01); *G02F 1/133507* (2021.01); *G02F 1/1357* (2021.01)

(58) Field of Classification Search
CPC .............. G02F 1/1357; G02F 1/133507; G02F 1/13718
See application file for complete search history.

(56) References Cited

U.S. PATENT DOCUMENTS 8,251,529 B2 8/2012 Boonekamp et al.
9,741,700 B2 8/2017 Kim
(Continued)

FOREIGN PATENT DOCUMENTS

CN 101218467 7/2008
DE 10-2016-201629 9/2016
(Continued)

OTHER PUBLICATIONS

International Search Report dated Nov. 30, 2021 issued in Application No. PCT/KR2021/010568.
(Continued)

*Primary Examiner* — Anne M Hines
(74) *Attorney, Agent, or Firm* — KED & ASSOCIATES, LLP

(57) ABSTRACT

The lighting device disclosed in the embodiment includes a substrate, a light emitting device disposed on a lower surface of the substrate, a reflective layer disposed to face a light emitting surface of the light emitting device, a first resin layer disposed between the substrate and the reflective layer, and a light-transmission control layer disposed on an upper surface of the substrate, wherein the light-transmission control layer may include a liquid crystal layer including a cholesteric liquid crystal, and light emitted through the light emitting surface of the light emitting device may be reflected by the reflective layer and be provided to the light-transmission control layer through the substrate.

20 Claims, 14 Drawing Sheets

Related U.S. Application Data continuation of application No. 18/019,327, filed as application No. PCT/KR2021/010568 on Aug. 10, 2021, now Pat. No. 11,886,087.

(56) References Cited

U.S. PATENT DOCUMENTS

| | | | |
|---|---|---|---|
| 11,630,308 B2 | 4/2023 | Sato et al. | |
| 2009/0033201 A1 | 2/2009 | Shimooka et al. | |
| 2010/0033954 A1 | 2/2010 | Boonekamp et al. | |
| 2010/0165660 A1 | 7/2010 | Weber et al. | |
| 2010/0265694 A1* | 10/2010 | Kim | G02B 6/0021 362/97.1 |
| 2015/0372064 A1 | 12/2015 | Kim | |
| 2016/0284674 A1 | 9/2016 | Kim | |
| 2017/0250368 A1 | 8/2017 | Kamiya | |
| 2018/0245748 A1 | 8/2018 | Park et al. | |
| 2019/0203904 A1 | 7/2019 | Lee et al. | |
| 2021/0011295 A1 | 1/2021 | Sato et al. | |
| 2023/0229002 A1 | 7/2023 | Sato et al. | |

FOREIGN PATENT DOCUMENTS

| | | |
|---|---|---|
| EP | 3597987 | 1/2020 |
| EP | 3597991 | 1/2020 |
| JP | 2003-242804 | 8/2003 |
| KR | 10-1096473 | 12/2011 |
| KR | 10-2012-0003271 | 1/2012 |
| KR | 10-1464795 | 11/2014 |
| KR | 10-2016-0000045 | 1/2016 |
| KR | 10-2019-0068915 | 6/2019 |
| KR | 10-2020-0007059 | 1/2020 |
| WO | WO 2008/044170 | 4/2008 |
| WO | WO 2019/189852 | 10/2019 |

OTHER PUBLICATIONS

U.S. Notice of Allowance dated Sep. 29, 2023 issued in U.S. Appl. No. 18/019,327.
U.S. Notice of Allowance dated Apr. 16, 2024 issued in U.S. Appl. No. 18/539,538.
European Search Report dated Aug. 28, 2024 issued in Application No. 21856185.0.

* cited by examiner (a)

(b)

(c)

(a)

(b)

(a)

(b)

LIGHTING DEVICE AND VEHICLE LAMP HAVING SAME

CROSS-REFERENCE TO RELATED PATENT APPLICATIONS

This application is a Continuation of U.S. patent application Ser. No. 18/539,538, filed Dec. 14, 2023, which is a Continuation of U.S. patent application Ser. No. 18/019,327, filed Feb. 2, 2023, now U.S. Pat. No. 11,886,087, which is a U.S. National Stage Application under 35 U.S.C. § 371 of PCT Application No. PCT/KR2021/010568, filed Aug. 10, 2021, which claims priority to Korean Patent Application No. 10-2020-0100399, filed Aug. 11, 2020, whose entire disclosures are hereby incorporated by reference.

TECHNICAL FIELD

The embodiment relates to a lighting device and a lamp including the same.

BACKGROUND ART

Lighting is used in various fields as a device that may supply light or control the amount of light. For example, the lighting device may be applied to various fields such as vehicles and buildings to illuminate the interior or exterior. In particular, in recent years, a light emitting device has been used as a light source for lighting. Such a light emitting device, for example, a light emitting diode (LED), has advantages such as low power consumption, semi-permanent lifespan, fast response speed, safety, environmental friendliness compared to conventional light sources such as fluorescent lamps and incandescent lamps. Such light emitting diodes are being applied to various optical assemblies such as various display devices, indoor lights, or outdoor lights.

In general, lamps of various colors and shapes are applied to vehicles, and recently, lamps employing light emitting diodes as light sources for vehicles have been proposed. For example, light emitting diodes are being applied to vehicle headlights, tail lights, turn signals, emblems, and the like. However, such a light emitting diode has a problem in that an exit angle of the emitted light is relatively small. For this reason, when the light emitting diode is used as a vehicle lamp, there is a demand for increasing the light emitting area of the lamp.

In addition, when the lamp includes the light emitting diode, there is a problem in that a hot spot is formed by the light emitted from the light emitting diode. In this case, when the surface light source is implemented using the lamp, there is a problem in that uniformity characteristics of the light emitting surface are deteriorated. In general, when a light emitting diode is applied to a vehicle lamp, there is a problem in that the light emitting diode is visually recognized from the outside. For example, when the vehicle lamp is on, it may not be visible by the light emitted from the light source, but when the lamp is off, the light emitting diode is visible from the outside, resulting in deterioration of the aesthetic and design freedom of the lamp. Therefore, a new lighting device and lamp capable of solving the above problems are required.

DISCLOSURE

Technical Problem

Embodiment provides a lighting device and a lamp having improved luminous intensity. Embodiment provides a lighting device and a lamp capable of realizing a uniform line light source or a surface light source. Embodiment provides a lighting device and a lamp that have flexibility and may improve design freedom and aesthetics.

Technical Solution

A lighting device according to the embodiment of the invention includes a substrate, a light emitting device disposed on a lower surface of the substrate, a reflective layer disposed to face a light emitting surface of the light emitting device, a first resin layer disposed between the substrate and the reflective layer, and a light-transmission control layer disposed on an upper surface of the substrate, and the light-transmission control layer may include a liquid crystal layer having a cholesteric liquid crystal, and light emitted through the light emitting surface of the light emitting device may be reflected by the reflective layer and provided to the light-transmission control layer through the substrate.

According to the embodiment of the invention, the liquid crystal layer may operate in one mode selected from reflection mode (Planner), scattering mode (Focal Conic), and transmission mode (Homeotropic) by applied power. A second resin layer disposed between the substrate and the light-transmission control layer may include, and the second resin layer may have a thickness smaller than that of the first resin layer. A wavelength conversion layer disposed between the second resin layer and the light-transmission control layer may include. According to the embodiment of the invention, a light-shielding sheet disposed between the second resin layer and the light-transmission control layer and including a plurality of light blocking patterns may include, and the light emitting device may overlap a portion of the light blocking pattern in a vertical direction. A density of the plurality of light blocking patterns may decrease as a distance from a region overlapping the light emitting device in a vertical direction is increased. The reflective layer may include a plurality of reflective patterns, and the reflective patterns may be disposed in a region that does not overlap with the light emitting device in the vertical direction. A portion of the light blocking pattern may be disposed in a region overlapping the reflective pattern in the vertical direction.

The vehicle lamp according to the embodiment of the invention is a vehicle to which a lamp including a lamp module is applied, and the lamp module may include a lighting device according to claim 1 or 2, and the cholesteric liquid crystal may have a spiral pitch corresponding to the color of the vehicle. When the liquid crystal layer operates in a reflection mode (Planner), the lighting device may have a color corresponding to the color of the vehicle. When the liquid crystal layer operates in a transmission mode (homeotropic), the lighting device may emit light having a set wavelength.

Advantageous Effects

Lighting device and lamp according to the embodiment may have improved light characteristics. Specifically, the lighting device and lamp may minimize the loss of light during the process of emitting light emitted from a light emitting device to the outside by a substrate with a set thickness, a first resin layer, a second resin layer, etc., and may be implemented as a uniform light source or a surface light source.

In the lighting device and the lamp according to the embodiment, the light emitted from the light emitting device is not directly emitted but is reflected by the reflective layer and emitted in an indirect light method, thereby preventing a light source from being viewed from the outside. Lighting device and lamps according to the embodiment may be provided in various forms according to the configuration of the substrate, the first resin layer, the reflective layer, etc. having a set thickness. In detail, the lighting device has flexibility and may be bent in various shapes such as the curved line and the straight line, so that it may be arranged in various shapes.

The lighting device and the lamp according to the embodiment may prevent a hot spot from being formed by light emitted from the light emitting device. In detail, the lighting device may include a light blocking sheet including a light blocking pattern, and the light blocking pattern may have a set density and size and be formed in a set region. Accordingly, it is possible to provide a linear light source or a surface light source having uniform light luminance. The lighting device and the lamp according to the embodiment may have improved heat dissipation characteristics. In detail, the lighting device may include first and second electrodes connected to the light emitting device, and the first and second electrodes may be disposed on the substrate in a mesh shape. Accordingly, the heat emitted from the light emitting device may be effectively dissipated through the mesh electrode. Accordingly, the lighting device and the lamp according to the embodiment may have improved reliability and uniform characteristics even when driven for a long time.

The lighting device and the lamp according to the embodiment may have a color set in a state in which the lighting device is turned off, for example, a color corresponding to or similar to that of a vehicle to which the lamp is applied. In detail, the lighting device and the lamp may include a liquid crystal layer including cholesteric liquid crystal, and the cholesteric liquid crystal may have a helical pitch corresponding to the color of the vehicle. Accordingly, when the lighting device is turned on, the lighting device may emit light of a set wavelength, and accordingly, when the lighting device is turned off, the lighting device and the lamp may have a color corresponding to the vehicle. Therefore, it is possible to derive a hidden effect capable of minimizing the visibility of the lamp or not being recognized from the outside, so that aesthetics and design freedom of the lamp may be improved.

BEST MODE

Figure 1:
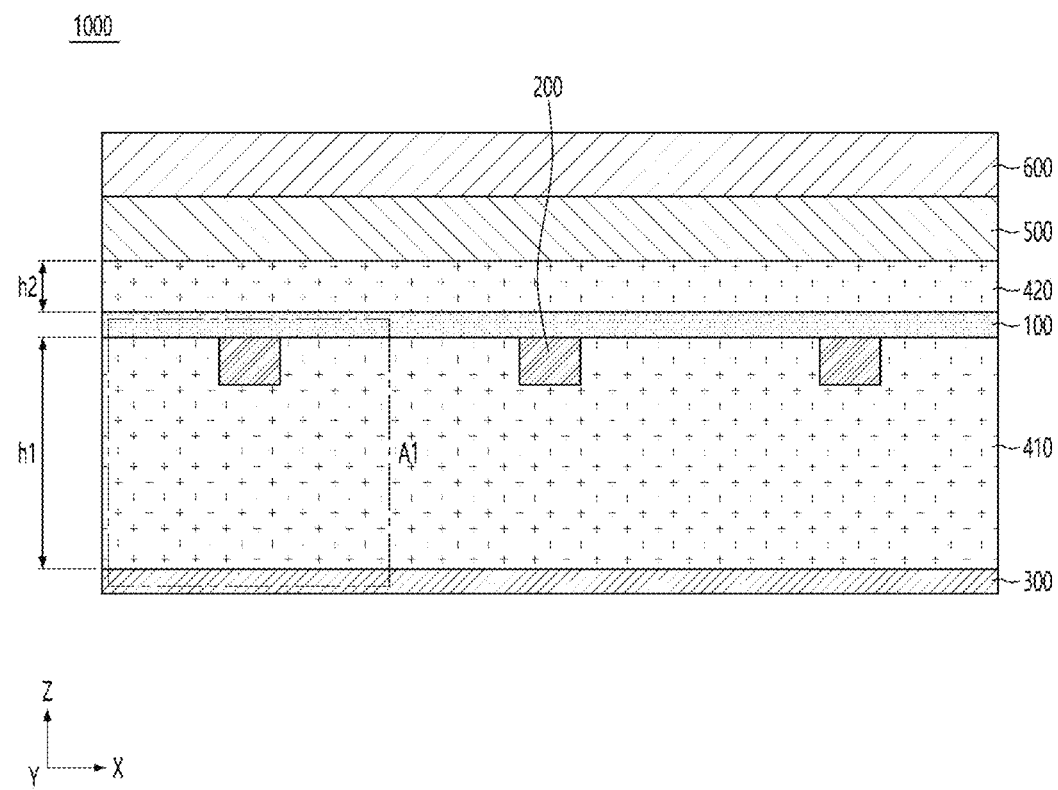
FIG. 1 is a cross-sectional view of a lighting device according to the embodiment.

Hereinafter, preferred embodiments of the invention will be described in detail with reference to the accompanying drawings.

The technical idea of the present invention is not limited to some of the described embodiments, but can be implemented in various different forms, and if it is within the scope of the technical idea of the present invention, one or more of its components may be selectively combined and substituted between embodiments. In addition, terms (including technical and scientific terms) used in the embodiments of the present invention, unless explicitly specifically defined and described, may be interpreted as a meaning that may be generally understood by those skilled in the art to which the present invention belongs, and terms generally used, such as terms defined in the dictionary, may be interpreted in consideration of the context of the related technology. Also, terms used in the embodiments of the present invention are for describing the embodiments and are not intended to limit the present invention. In the present specification, the singular form may include a plural form unless specifically described in the phrase, and may include at least one of all combinations that may be combined as A, B, and C when described as "A and/or at least one (or more than one) of B and C". Also, terms such as first, second, A, B, (a), and (b) may be used to describe components of an embodiment of the present invention. These terms are intended only to distinguish the components from other components and are not determined by their nature, sequence, or order. Also, when a component is described as being 'connected', 'coupled' or 'connected' to another component, not only when the component is directly connected, coupled or connected to another component, it may also be 'connected', 'coupled', or 'connected' due to another component between that component and the other component. In addition, when each component is described as being formed or disposed "up (above) or down (bottom)", the up (down) or down (bottom) includes not only when two components are in direct contact with each other, but also when one or more components are formed or disposed between two components. Also, when expressed as "up (above) or down (bottom)", it may include the meaning of not only the upward direction but also the downward direction based on one component.

The lighting device according to the invention may be applied to various lamp devices that require lighting, such as vehicle lamps, household optical assemblies, and industrial optical assemblies. For example, when applied to a vehicle lamp, it may be applied to head lamp, side mirror lights, side maker lights, fog lights, tail lights, brake lights, daytime running lights, vehicle interior lights, door scars, rear combination lamps, backup lamps, etc. In addition, when applied to a vehicle lamp, it is applicable to a rear side assistance system (BSD) disposed in a side mirror or a-pillar, etc. Also, the optical assembly of the present invention may be applied to indoor and outdoor advertising devices, display devices, and various electric vehicle fields, and in addition to all lighting-related fields or advertising-related fields that are currently developed and commercialized or may be implemented according to technological development in the future, etc. would be applicable.

Figure 2:
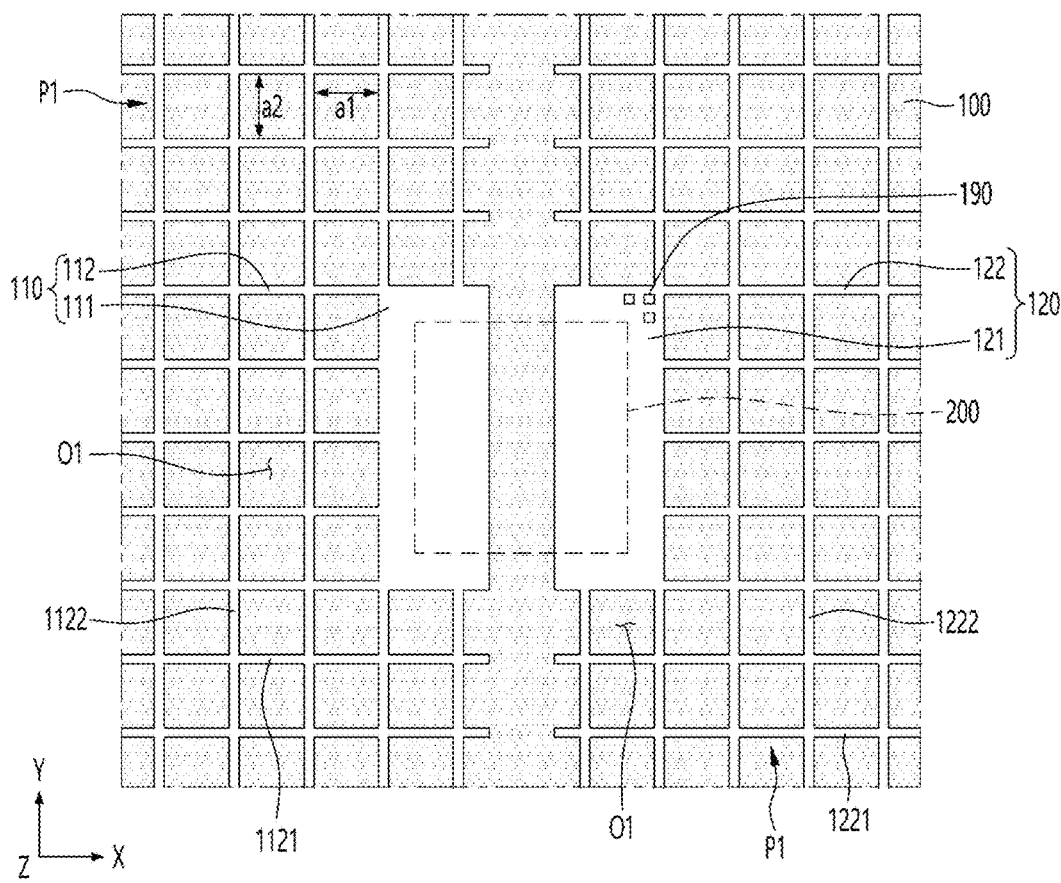
FIG. 2 is a plan view illustrating an electrode layer according to the embodiment.
Figure 3:
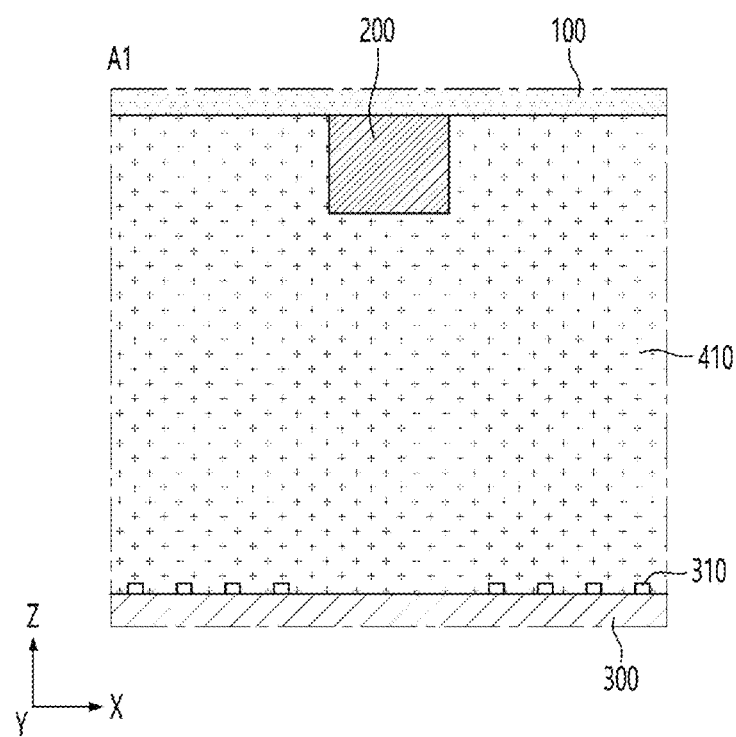
FIG. 3 is an enlarged view of region A1 of FIG. 1.
Figure 4:
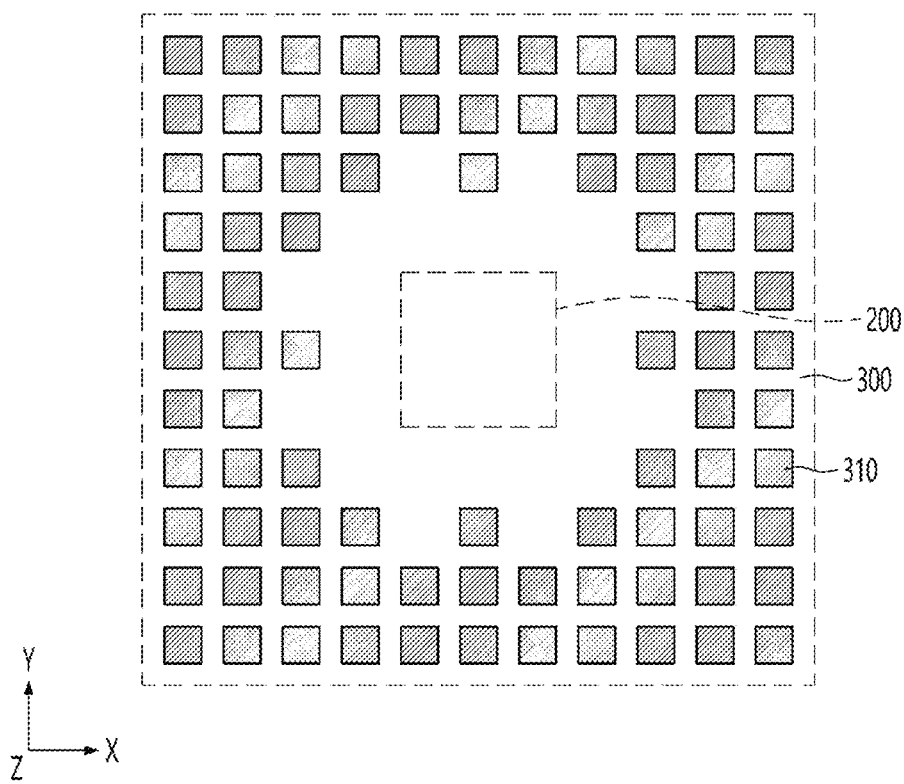
FIG. 4 is a plan view of a reflective layer according to the embodiment.
Figure 5:
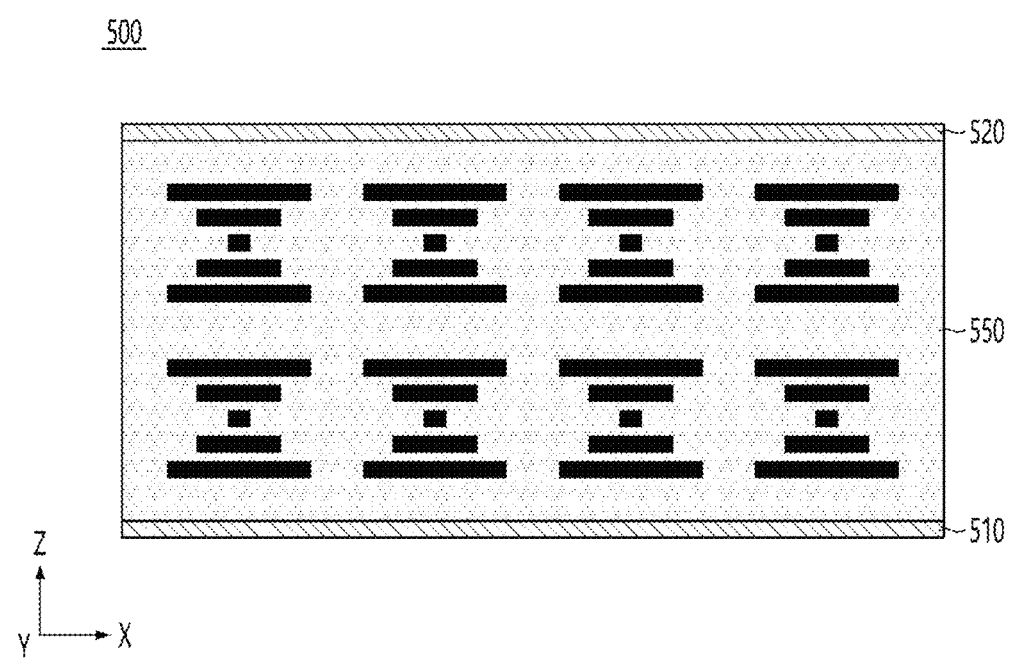
FIG. 5 is a cross-sectional view of a light-transmission control layer according to the embodiment.
Figure 6:
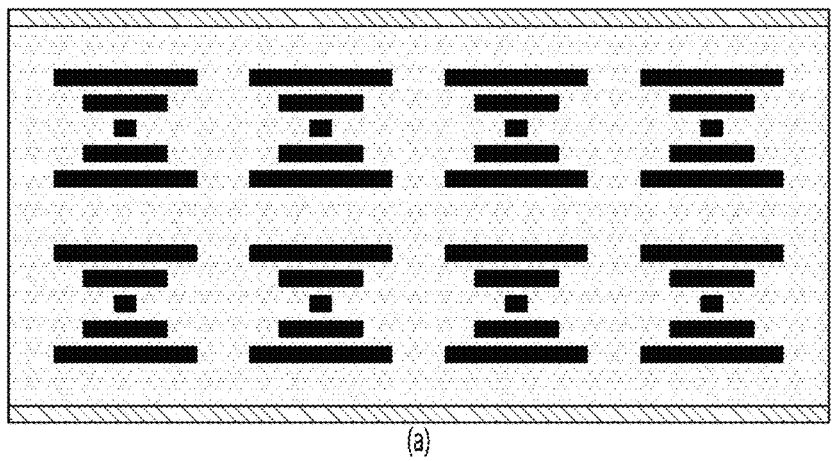
FIG. 6 (a) to (c) are diagrams for explaining various operational examples of a light-transmission control layer according to the embodiment.
Figure 6:
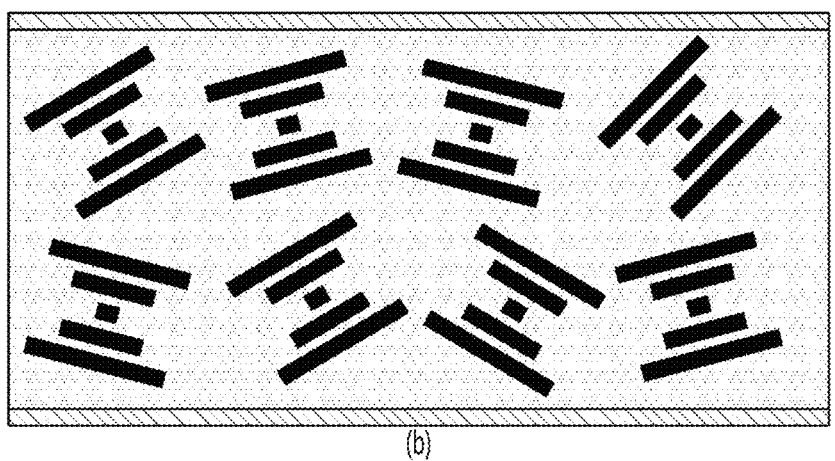
Figure 6:
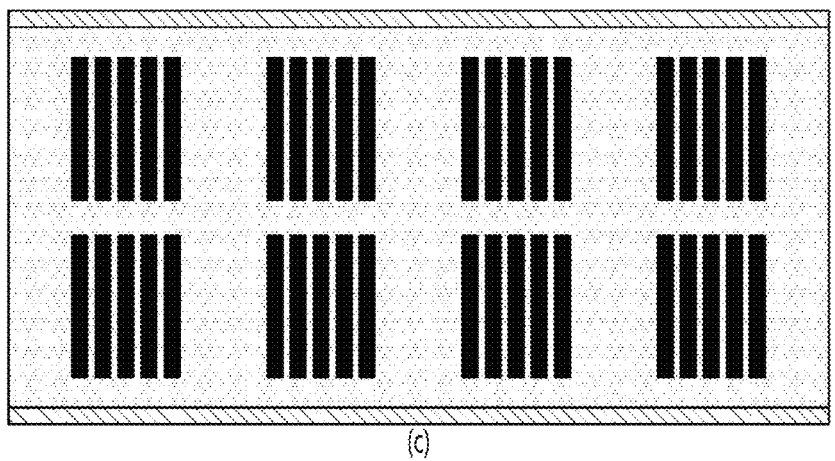

In addition, prior to the description of the embodiment of the invention, the first direction may mean the x-axis direction shown in the drawing, and the second direction may be a direction different from the first direction. For example, the second direction may mean a y-axis direction shown in the drawing as a direction perpendicular to the first direction. Also, the horizontal direction may mean first and second directions, and the vertical direction may mean a direction perpendicular to at least one of the first and second directions. For example, the horizontal direction may mean x-axis and y-axis directions of the drawing, and the vertical direction may be z-axis directions of the drawing and may be directions perpendicular to x-axis and y-axis directions FIG. 1 is a cross-sectional view of a lighting device according to an embodiment, and FIG. 2 is a plan view illustrating an electrode layer according to an embodiment. FIG. 3 is an enlarged view of area A1 of FIG. 1, and FIG. 4 is a plan view of a reflective layer according to an embodiment. 5 is a cross-sectional view of a light-transmission control layer according to an embodiment, and FIG. 6 is a view for explaining various operational examples of the light-transmission control layer according to an embodiment.

Referring to FIGS. 1 to 4, the lighting device 1000 according to the embodiment may include a substrate 100, a light emitting device 200, a reflective layer 300, a first resin layer 410, a second resin layer 420, and a light-transmission control layer 500. The lighting device 1000 may emit light emitted from the light emitting device 200 as a surface light source. The lighting device 1000 may be defined as a light emitting cell, a lighting module, or a light source module. The lighting device 1000 may include one light emitting cell or a plurality of light emitting cells on the substrate 100.

The substrate 100 may include a light-transmissive material. In detail, the substrate 100 may include a material through which light is transmitted through upper and lower surfaces. The substrate 100 may be defined as a transparent substrate. The substrate 100 may include at least one of polyethylene terephthalate (PET), polystyrene (PS), polyimide (PI), polyethylene naphthalate (PEN), and polycarbonate (PC). The substrate 100 may have a thickness of about 30 µm to about 300 µm. When the substrate 100 is less than about 30 µm thick, it may be difficult to effectively support the light emitting device 200 on the substrate 100, for example, the weight of the light emitting device 200 may cause a region of the substrate 100 on which the light emitting device 200 is disposed. Accordingly, the reliability of the substrate 100 may deteriorate, and an alignment problem of the light emitting device 200 disposed on the substrate 100 may occur. Also, when the thickness of the substrate 100 exceeds about 300 µm, the total thickness of the lighting device 1000 may increase and flexibility of the substrate 100 may decrease. In addition, when the thickness of the substrate 100 exceeds about 300 µm, a path of light emitted by the thickness of the substrate 100 may change, and as a result, it may be difficult to implement a uniform surface light source.

Electrode layers 110 and 120 may be disposed on the substrate 100. The electrode layers 110 and 120 may be disposed on the lower surface of the substrate 100 facing the reflective layer 300 to be described later. The first electrode 110 and the second electrode 120 may be spaced apart from each other on the lower surface of the substrate 100. For example, the first electrode 110 and the second electrode 120 may be spaced apart from each other based on the light emitting device 200. Accordingly, the first electrode 110 and the second electrode 120 may be electrically separated from each other. The first electrode 110 and the second electrode 120 may be disposed on the lower surface of the substrate 100 in various forms. The first electrode 110 and the second electrode 120 may include a conductive material. For example, the first electrode 110 and the second electrode 120 may include at least one of aluminum (Al), copper (Cu), silver (Ag), gold (Au), chromium (Cr), nickel (Ni), molybdenum (Mo), titanium (Ti), and alloys thereof, carbon (C), and a conductive polymer. In addition, the first electrode 110 and the second electrode 120 may include at least one of transparent conductive materials, such as ITO (indium tin oxide), IZO (indium zinc oxide), IZTO (indium zinc tin oxide), IAZO (indium aluminum zinc oxide), IGZO (indium gallium zinc oxide), IGTO (indium gallium tin oxide), AZO (aluminum zinc oxide), ATO (antimony tin oxide), and (GZO) gallium zinc oxide.

The first electrode 110 and the second electrode 120 may provide current to the light emitting device 200. For example, the first electrode 110 may provide a current with a first polarity to the light emitting device 200, and the second electrode 120 may provide a current with a second polarity opposite to the first polarity to the light emitting device 200. Referring to the first electrode 110 and the second electrode 120 in more detail, the first electrode 110 may include a first pad 111 and a first electrode pattern 112.

The first pad 111 may be disposed in a region corresponding to the light emitting device 200. For example, the first pad 111 may be disposed in a region corresponding to a first bonding portion (not shown) of the light emitting device 200. The first electrode pattern 112 may be disposed around the first pad 111. The first electrode pattern 112 may be connected to the first pad 111. The first electrode pattern 112 may be electrically connected to the first bonding portion of the light emitting device 200. The first electrode pattern 112 may include a plurality of first sub-wires 1121 and a plurality of second sub-wires 1122 extending in different directions. The plurality of first sub-wires 1121 may extend in a first direction. Also, the plurality of first sub-wires 1121 may be spaced apart from each other in a second direction perpendicular to the first direction. Also, the plurality of second sub-wires 1122 may extend in the second direction. Also, the plurality of second sub-wires 1122 may be spaced apart from each other in the first direction. The first electrode pattern 112 may have a mesh shape in which the first sub-wires 1121 and the second sub-wires 1122 cross each other.

The first electrode pattern 112 may have a set line width. For example, the line width of the first electrode pattern 112 may be about 80 µm or less. In detail, the line width of the first electrode pattern 112 may be about 60 µm or less. In more detail, the line width of the first electrode pattern 112 may be about 3 µm or less. Line widths of the plurality of first sub-wires 1121 may be the same within the line width range described above. Line widths of the plurality of second sub-wires 1122 may be the same within the line width range described above. Also, line widths of the first sub-wire 1121 and the second sub-wire 1122 may be the same.

The second electrode 120 may include a second pad 121 and a second electrode pattern 122. The second pad 121 may be spaced apart from the first pad 111 and the first electrode pattern 112 and disposed in a region corresponding to the light emitting device 200. For example, the second pad 121 may be disposed in a region corresponding to a second bonding portion (not shown) of the light emitting device 200. The second electrode pattern 122 may be disposed around the second pad 121. The second electrode pattern 122 may be spaced apart from the first pad 111 and the first electrode pattern 112 and connected to the second pad 121. The second electrode pattern 122 may be electrically connected to the second bonding portion of the light emitting device 200.

The second electrode pattern 122 may include a plurality of third sub-wires 1221 and a plurality of fourth sub-wires 1222 extending in different directions. The plurality of third sub-wires 1221 may extend in a first direction. Also, the plurality of third sub-wires 1221 may be spaced apart from each other in a second direction perpendicular to the first direction. Also, the plurality of fourth sub-wires 1222 may extend in the second direction. Also, the plurality of fourth sub-wires 1222 may be spaced apart from each other in the first direction. The second electrode pattern 122 may have a mesh shape in which the third sub-wire 1221 and the fourth sub-wire 1222 cross each other.

The second electrode pattern 122 may have a set line width. The second electrode pattern 122 may have the same line width as the first electrode pattern 112. For example, the line width of the second electrode pattern 122 may be about 80 μm or less. In detail, the line width of the second electrode pattern 122 may be about 60 μm or less. In more detail, the line width of the second electrode pattern 122 may be about 35 μm or less. Line widths of the plurality of third sub-wires 1221 may be the same within the aforementioned range. Line widths of the plurality of fourth sub-wires 1222 may be the same within the described range. Also, the line widths of the third sub-wire 1221 and the fourth sub-wire 1222 may be the same as each other. Line widths of the first to fourth sub-wires 1222 may be the same as each other.

Each of the first electrode 110 and the second electrode 120 may include a first pattern region P1. In detail, each of the first electrode pattern 112 and the second electrode pattern 122 may include a first pattern region P1. The first pattern region P1 of the first electrode pattern 112 may be a region formed by the first sub-wire 1121 and the second sub-wire 1122 arranged in a mesh shape. Also, the first pattern region P1 of the second electrode pattern 122 may be a region formed by the third sub-wire 1221 and the fourth sub-wire 1222 arranged in a mesh shape. The first pattern region P1 of each of the first and second electrode patterns 112 and 122 may include a plurality of first unit patterns having a first opening region O1. A plurality of first unit patterns of the first and second electrodes 110 and 120 may have a set size. The first unit patterns of the first and second electrodes 110 and 120 may have the same size. The first unit pattern may have a mesh shape.

The first unit pattern of each of the first and second electrodes 110 and 120 may have a horizontal width a1 and a vertical width a2. In this case, each of the horizontal width a1 and the vertical width a2 of the first unit pattern may be about 450 μm or less. In detail, each of the horizontal width a1 and the vertical width a2 of the first unit pattern may be about 400 μm or less. When the horizontal width a1 and the vertical width a2 exceed about 450 μm, the total areas of the first and second electrode patterns 112 and 122 disposed on the substrate 100 may be small. Accordingly, it may be difficult to effectively discharge heat emitted from the light emitting device 200 through the electrode layers 110 and 120. In addition, when the horizontal width a1 and the vertical width a2 exceed about 450 μm, it may be difficult to prevent a hot spot phenomenon in which light L emitted from the light emitting device 200 is concentrated. Accordingly, it is preferable that the horizontal width a1 and vertical width a2 of the first unit pattern satisfy the described range. The horizontal width a1 and the vertical width a2 of each of the first unit patterns in the first and second electrodes 110 and 120 may be different or the same. For example, when the horizontal width a1 and the vertical width a2 are different from each other, the first unit pattern may have a rectangular shape. Also, when the horizontal width a1 and the vertical width a2 are equal to each other, the first unit pattern may have a square shape. Preferably, the horizontal and vertical widths a1 and a2 of the first unit pattern may be the same in consideration of heat dissipation characteristics and light emitting characteristics of the lighting device 1000.

An electrode position indicator 190 may be formed on the electrode layers 110 and 120. The electrode position indicator 190 may be formed on one pad selected from among the first pad 111 and the second pad 121. For example, the electrode position indicator 190 may be formed to indicate the polarity of at least one of the cathode and anode, and may be formed by forming a groove in the selected pad.

The light emitting device 200 may be disposed on the substrate 100. For example, the light emitting device 200 may be disposed on the lower surface of the substrate 100. The light emitting device 200 may be disposed facing the reflective layer 300. The light emitting device 200 is an LED chip emitting light on at least five sides, and may be disposed on the substrate 100 in a flip chip form. Alternatively, the light emitting device 200 may be a horizontal chip or a vertical chip. In the horizontal chip, two different electrodes may be disposed in a horizontal direction, and in the vertical chip, two different electrodes may be disposed in a vertical direction. Since the light emitting device 200 is connected to another chip or wiring pattern by a wire in the case of the horizontal chip or the vertical chip, the thickness of the module may increase due to the height of the wire and a pad space for bonding the wire may be required.

The light emitting device 200 may include a package in which an LED chip is packaged. The LED chip may emit at least one of blue, red, green, ultraviolet (UV), and infrared light, and the light emitting device 200 may emit at least one of white, blue, red, green, and infrared light. The light emitting device 200 may be a top view type in which a bottom portion is electrically connected to the substrate 100. An optical axis of the light emitting device 200 may be perpendicular to the lower surface of the substrate 100. The light emitting device 200 may be electrically connected to the electrode layers 110 and 120. For example, the light emitting device 200 may be electrically connected to the first electrode 110 and the second electrode 120 on the substrate 100 by a conductive bonding member (not shown) with the substrate 100. The conductive bonding member may be a solder material or a metal material. A plurality of light emitting devices 200 may be disposed on the substrate 100. For example, a plurality of light emitting devices 200 spaced apart in a first direction (x-axis direction) may be disposed on the substrate 100. In addition, a plurality of light emitting devices 200 spaced apart in a second direction (y-axis direction) may be disposed on the substrate 100.

The plurality of light emitting devices 200 may emit light of the same color as each other. For example, the plurality of light emitting devices 200 may emit light of the same wavelength band towards the reflective layer 300. Alternatively, the plurality of light emitting devices 200 may emit light in different wavelength bands. For example, some of the plurality of light emitting devices 200 may emit light in a first wavelength band, and the rest or other parts may emit light in a second wavelength band different from the first wavelength band. Accordingly, the lighting device 1000 may provide light of various wavelength bands using one device.

The light emitting device 200 may include a light emitting surface from which light is emitted. A light emitting surface of the light emitting device 200 may face an upper surface of the reflective layer 300. The light emitting surface may include a flat surface, and a flat surface of the light emitting surface may be parallel to an upper surface of the reflective layer 300. The light emitting surface of the light emitting device 200 may emit light L of the highest intensity in the third direction (z-axis direction), for example, toward the top surface of the reflective layer 300. In addition, the light emitting surface may include a concave surface or a convex surface.

The light emitting device 200 may emit light L3 toward the reflective layer 300. For example, the light L3 emitted through the light emitting surface of the light emitting device 200 may be provided to the reflective layer 300. The light L3 provided to the reflective layer 300 may be reflected by the reflective layer 300 and emitted toward the substrate 100, and the light L3 passing through the substrate 100 may have a shape of a line light source or a surface light source. That is, the lighting device 1000 may be an indirect lighting device. Accordingly, it is possible to prevent the light emitting device 200 from being visually recognized from the outside. In this case, the optical axis of the light emitting device 200 may be perpendicular to the lower surface of the substrate 100. Also, an optical axis of the light emitting device 200 may be perpendicular to the upper surface of the reflective layer 300.

The reflective layer 300 may be disposed on the substrate 100. In detail, the reflective layer 300 may be disposed on the lower surface of the substrate 100. The reflective layer 300 may be disposed at a position lower than the lower surface of the substrate 100 and the light emitting device 200. The reflective layer 300 is spaced apart from the substrate 100 and the light emitting device 200 and may be disposed to face a light emitting surface of the light emitting device 200. The reflective layer 300 may have an area greater than or equal to that of the lower surface of the substrate 100.

The reflective layer 300 may be provided in the form of a film having a metallic material or a non-metallic material. The metallic material may include a metal such as aluminum, silver, or gold. The non-metallic material may include a plastic material or a resin material. The plastic material may be any one selected from the group consisting of polyethylene, polypropylene, polystyrene, polyvinyl chloride, polychloride biphenyl, polyethylene terephthalate, polyvinyl alcohol, polycarbonate, polybutylene terephthalate, polyethylene naphthalate, polyamide, polyacetal, polyphenylene ether, polyamide, polyetherimide, polyether ether ketone, polyimide, polytetrafluoroethylene, a liquid crystal polymer, a fluorine resin, and a mixture thereof. As the resin material, a reflective material such as $TiO_2$, $Al_2O_3$, or $SiO_2$ may be added to silicon or epoxy.

The reflective layer 300 may be implemented as a single layer or multiple layers, and light reflection efficiency may be improved by such a layer structure. The reflective layer 300 according to an embodiment of the invention may increase the amount of light so that the light is uniformly distributed by reflecting the incident light.

The reflective layer 300 may have a thickness of about 50 μm to about 500 μm. When the thickness of the reflective layer 300 is less than about 50 μm, light reflection characteristics of the reflective layer 300 may deteriorate and reliability of the lighting device 1000 may deteriorate. Also, when the thickness of the reflective layer 300 exceeds about 500 μm, the overall thickness of the lighting device 1000 may increase, and as a result, the flexibility of the lighting device 1000 may deteriorate. Preferably, the thickness of the reflective layer 300 may be about 80 μm to about 350 μm in consideration of reliability and light reflection characteristics. The reflective layer 300 may include a reflective pattern 310. The reflective pattern may have a plurality of dot shapes. The plurality of reflective patterns 310 may be disposed on a lower surface of the substrate 100 and an upper surface of the reflective layer 300 facing the light emitting device 200.

The plurality of reflective patterns 310 may be disposed on the upper surface of the reflective layer 300 in a protruding form. For example, the reflective pattern 310 may be disposed on the upper surface of the reflective layer 300 in a form protruding toward the light emitting device 200. The plurality of reflective patterns 310 may be spaced apart from each other in the first direction and the second direction, and may be disposed in a region that does not correspond to the light emitting device 200. In detail, the plurality of reflective patterns 310 may be disposed in a region that does not overlap with the light emitting device 200 in the vertical direction (third direction, z-axis direction). The plurality of reflective patterns 310 may be formed through a printing process. For example, the plurality of reflective patterns 310 may include reflective ink. The plurality of reflective patterns 310 may be printed with a material including any one of $TiO_2$, $CaCO_3$, $BaSO_4$, $Al_2O_3$, Silicon, and PS. The material of the reflective pattern 310 may be white with excellent reflective properties.

When viewed from above, the plurality of reflective patterns 310 may have various shapes such as circular, elliptical, and polygonal shapes. In addition, each of the plurality of reflective patterns 310 may have a hemispherical or a polygonal shape in a side cross section. The dot pattern density of the plurality of reflective patterns 310 may change as the distance from the region corresponding to the light emitting device 200 increases. For example, the density of the plurality of reflective patterns 310 may increase as the distance from an overlapping region perpendicularly overlapping the light emitting device 200 within the upper surface of the reflective layer 300 increases. That is, the density of the plurality of reflective patterns 310 may increase as the distance from the optical axis of the light emitting device 200 in the horizontal direction increases. The size of each of the plurality of reflective patterns 310 may change as the distance from the overlapping region increases. For example, a horizontal width of each of the plurality of reflective patterns 310 may increase as the distance from the overlapping region increases. That is, the width of each of the reflective patterns 310 may increase as the distance from the optical axis of the light emitting device 200 in the horizontal direction increases. That is, since the plurality of reflective patterns 310 are disposed on the upper surface of the reflective layer 300 that does not overlap the light emitting device 200, the reflective layer 300 may improve the reflectance of light emitted from the light emitting device 200. Accordingly, the lighting device 1000 may reduce the loss of light emitted to the outside through the substrate 100 and improve the luminance of the surface light source.

The first resin layer 410 may be disposed on the substrate 100. The first resin layer 410 may be disposed on the lower surface of the substrate 100. The first resin layer 410 may be disposed between the substrate 100 and the reflective layer 300. The first resin layer 410 may be disposed between the lower surface of the substrate 100 and the upper surface of the reflective layer 300. The first resin layer 410 may be disposed on the entire or partial region of the lower surface of the substrate 100. The first resin layer 410 may be formed of a transparent material. The first resin layer 410 may include a resin material such as silicone or epoxy. The first resin layer 410 may include a thermosetting resin material, such as PC, OPS, PMMA, or PVC selectively. For example, a resin material containing urethane acrylate oligomer as a main material may be used as the main material of the first resin layer 410. For example, a mixture of a synthetic oligomer, urethane acrylate oligomer, and a polyacrylic polymer type may be used. Of course, a monomer in which IBOA (isononyl acrylate), HPA (Hydroxypropyl acrylate, 2-HEA (2-hydroxyethyl acrylate) and the like, which are low-boiling dilute reactive monomers, may be further included, and a photoinitiator (e.g., 1-hydroxycyclohexyl phenyl-ketone) or an antioxidant may be mixed as an additive. The first resin layer 410 may be formed of glass, but is not limited thereto.

Since the first resin layer 410 is provided as a layer for guiding light with resin, the first resin layer 410 may be provided with a thinner thickness than glass and may be provided as a flexible plate. The first resin layer 410 may emit a point light source emitted from the light emitting device 200 in the form of a line light source or a surface light source. The upper surface of the first resin layer 410 may emit light by diffusing light emitted from the light emitting device 200. For example, the first resin layer 410 may include beads (not shown) therein, and the beads diffuse and reflect incident light to increase the amount of light. The beads may be disposed in a range of 0.01 to 0.3% of the weight of the first resin layer 410. The bead may be formed of any one selected from silicon, silica, glass bubble, PMMA (Polymethyl methacrylate), urethane, Zn, Zr, $Al_2O_3$, and acryl, and the particle diameter of the bead may be in the range of about 1 μm to about 20 μm, but is not limited. The first resin layer 410 may have a thickness greater than that of the light emitting device 200. For example, the first resin layer 410 may have a thickness of about 5 mm or less. In detail, the first resin layer 410 may have a thickness of about 0.5 mm to about 4 mm. When the thickness h1 of the first resin layer 410 is less than about 0.5 mm, it may be difficult to effectively guide light to be emitted from the light emitting device 200. That is, since the distance between the light emitting device 200 and the reflective layer 300 is too small, it may be difficult for the lighting device 1000 to implement a surface light source. Also, when the thickness h1 of the first resin layer 410 exceeds about 4 mm, the entire light path may increase. Accordingly, light loss may occur during the process of emitting light emitted from the light emitting device 200. Accordingly, it is preferable that the thickness h1 of the first resin layer 410 satisfies the described range.

The first resin layer 410 may surround the light emitting device 200. The first resin layer 410 may seal the light emitting device 200. The first resin layer 410 may protect the light emitting device 200 and reduce loss of light emitted from the light emitting device 200. The first resin layer 410 may contact a surface of the light emitting device 200 and may contact the light emitting surface of the light emitting device 200. Also, the first resin layer 410 may contact the lower surface of the substrate 100 and the upper surface of the reflective layer 300. That is, the first resin layer 410 may support the substrate 100, the light emitting device 200, and the reflective layer 300, and the components 100, 200, and 300 may maintain a set position, interval, and shape.

The second resin layer 420 may be disposed on the substrate 100. The second resin layer 420 may be disposed on an upper surface of the substrate 100 opposite to a lower surface of the substrate 100 on which the first resin layer 410 is disposed. The second resin layer 420 may be disposed on the entire upper surface or a partial region of the substrate 100. The second resin layer 420 may be formed of a transparent material. The second resin layer 420 may include a resin material such as silicone or epoxy. The second resin layer 420 may include a thermosetting resin material, such as PC, OPS, PMMA, or PVC selectively. For example, as a main material of the second resin layer 420, a resin material containing urethane acrylate oligomer as a main material may be used. For example, a mixture of a synthetic oligomer, urethane acrylate oligomer, and a polyacrylic polymer type may be used. Of course, a monomer in which IBOA (isobornyl acrylate), HPA (hydroxyl propyl acrylate), 2-HEA (2-hydroxyethyl acrylate), and the like, which are low-boiling dilute reactive monomers, may be further included, and a photoinitiator (e.g., 1-hydroxycyclohexyl phenyl-ketone) or an antioxidant may be mixed as an additive. The second resin layer 420 may include the same material as the first resin layer 410. The second resin layer 420 may be made of glass, but is not limited thereto.

The second resin layer 420 may serve as a light guiding layer. For example, the second resin layer 420 may guide light incident through the first resin layer 410 and the substrate 100. In detail, the second resin layer 420 may further diffuse light that is reflected from the reflective layer 300 and has passed through the first resin layer 410 and the substrate 100. For example, a bead (not shown) may be included in the second resin layer 420, and the bead diffuses and reflects incident light to increase the amount of light. The beads may be disposed in a range of 0.01 to 0.3% of the weight of the second resin layer 420. The bead may be formed of any one selected from silicon, silica, glass bubble, PMMA (Polymethyl methacrylate), urethane, Zn, Zr, $Al_2O_3$, and acryl, and the particle diameter of the bead may be in the range of about 1 μm to about 20 μm, but is not limited thereto.

The second resin layer 420 may function as an adhesive layer. For example, the second resin layer 420 may serve as an adhesive layer for mutually bonding the substrate 100 disposed under the second resin layer 420 and a separate component disposed thereon. The second resin layer 420 may have a set thickness h2. For example, the thickness h2 of the second resin layer 420 may be about 2 mm or less. In detail, the thickness h2 of the second resin layer 420 may be about 50 μm to about 1.5 mm. When the thickness h2 of the second resin layer 420 is less than about 50 μm, it may be difficult to perform a function of an adhesive layer that adheres components disposed above and below the second resin layer 420, and it may be difficult to effectively guide light incident on the second resin layer 420. That is, since the thickness h2 of the second resin layer 420 is relatively thin, a space for guiding light emitted through the substrate 100 may be insufficient. In addition, when the lighting device 1000 is bent in a third direction by an external force, such as a wave, the thickness h2 of the second resin layer 420 may be too thin to effectively guide light emitted through the substrate 100 and the first resin layer 410.

When the thickness h2 of the second resin layer 420 exceeds about 1.5 mm, the luminance uniformity characteristic of light emitted through the second resin layer 420 may deteriorate. In addition, when the thickness h2 of the second resin layer 420 exceeds about 1.5 mm, the total thickness of the lighting device 1000 may increase, and the degree of freedom of design may decrease, and light loss may occur due to the thickness h2 of the second resin layer 420. Therefore, it is preferable that the thickness h2 of the second resin layer 420 satisfies the described range. The thickness h2 of the second resin layer 420 may be different from the thickness h1 of the first resin layer 410. For example, the thickness h2 of the second resin layer 420 may be smaller than the thickness h1 of the first resin layer 410. For example, the thickness h2 of the second resin layer 420 may be about 3% to about 98% of the thickness h1 of the first resin layer 410. Accordingly, the lighting device 1000 according to the embodiment may emit light with a surface light source having excellent uniformity. That is, as the first and second resin layers 410 and 420 satisfy the described thickness range, the uniformity of light emitted through the upper surface of the second resin layer 420 may be excellent.

Referring to FIGS. 1 to 6, the light-transmission control layer 500 may be disposed on the substrate 100. In detail, the light-transmission control layer 500 may be disposed on the second resin layer 420. The light-transmission control layer 500 may control transmission of light emitted through the upper surface of the second resin layer 420 or light incident toward the second resin layer 420 through the upper surface of the light-transmission control layer 500. The light-transmission control layer 500 may include a first electrode layer 510, a second electrode layer 520 and a liquid crystal layer 550.

The first electrode layer 510 and the second electrode layer 520 may be disposed on the second resin layer 420. In detail, the first electrode layer 510 may be disposed between an upper surface of the second resin layer 420 and a lower surface of the liquid crystal layer 550, and the second electrode layer 520 may be disposed on an upper surface of the liquid crystal layer 550. The first electrode layer 510 and the second electrode layer 520 may apply power to the liquid crystal layer 550. To this end, the first electrode layer 510 and the second electrode layer 520 may include a conductive material. For example, the first electrode layer 510 and the second electrode layer 520 may include at least one of aluminum (Al), copper (Cu), silver (Ag), gold (Au), chromium (Cr), nickel (Ni), molybdenum (Mo), titanium (Ti), and an alloy thereof, carbon (C), and a conductive polymer. In addition, the first electrode layer 510 and the second electrode layer 520 may include a transparent conductive material, such as at least one of ITO (indium tin oxide), IZO (indium zinc oxide), IZTO (indium zinc tin oxide), IAZO (indium aluminum zinc oxide), IGZO (indium gallium zinc oxide), IGTO (indium gallium tin oxide), AZO (aluminum zinc oxide), ATO (antimony tin oxide), and GZO (gallium zinc oxide).

The liquid crystal layer 550 may be disposed between the first electrode layer 510 and the second electrode layer 520. The liquid crystal layer 550 may include at least one of smectic liquid crystal, nematic liquid crystal, and cholesteric liquid crystal. As an example, the liquid crystal layer 550 according to the embodiment may include cholesteric liquid crystal. The cholesteric liquid crystal may have a spiral shape in which molecules rotate at regular intervals. The cholesteric liquid crystal may be disposed while repeating rotation in a spiral shape at a set pitch, and may reflect light in a wavelength band set according to the pitch. In detail, the cholesteric liquid crystal may reflect light in a wavelength band as shown in Equation 1 below.

$$\lambda = nP \cos\theta \qquad \text{[Equation 1]}$$

In Equation 1, λ may mean a peak wavelength band of reflected light, and n may mean a refractive index of the liquid crystal layer 550. In addition, P means a helical pitch value of liquid crystal molecules, and θ means an incident angle of light incident on the liquid crystal layer 550.

The liquid crystal layer 550 may form cholesteric liquid crystal repeating spiral rotation by using a chiral agent that forms twist between liquid crystal molecules. In addition, the liquid crystal layer 550 may control the pitch of liquid crystal molecules by controlling the content of the chiral agent. The liquid crystal layer 550 may operate in various modes by power applied from the first electrode layer 510 and the second electrode layer 520. For example, the liquid crystal layer 550 may operate in one mode selected from a reflection mode (Planar), a scattering mode (Focal Conic), and a transmission mode (Homeotropic) according to the applied power.

Referring to FIG. 6 (a), the liquid crystal layer 550 may operate in a reflection mode (Planar). The reflection mode may be a state in which power is not applied to the liquid crystal layer 550. That is, an electric field may not be formed in the liquid crystal layer 550. In the reflection mode (Planar), a spiral axis of the liquid crystal may be aligned perpendicular to or close to the vertical axis of the first electrode layer 510 or the second electrode layer 520. In the reflection mode, the liquid crystal layer 550 may reflect light of a set wavelength. In detail, in the reflection mode, the liquid crystal layer 550 may reflect light of a wavelength according to a helical pitch of liquid crystal molecules. Referring to FIG. 6 (b), the liquid crystal layer 550 may operate in a scattering mode (Focal Conic). The scattering mode may be a state in which predetermined power is applied to the liquid crystal layer 550. That is, a predetermined electric field may be formed in the liquid crystal layer 550. In the scattering mode (Focal Conic), the liquid crystals may be randomly arranged. In the scattering mode, the liquid crystal layer 550 may scatter, diffract, or diffusely reflect incident light, and as a result, the liquid crystal layer 550 may be in an opaque state.

Referring to FIG. 6 (c), the liquid crystal layer 550 may operate in a transmission mode (Homeotropic). The transmission mode may be a state in which predetermined power is applied to the liquid crystal layer 550. In detail, the transmission mode may be a state in which a higher power than the scattering mode, for example, a set power is applied. That is, an electric field greater than the scattering mode may be formed in the liquid crystal layer 550. In the transmission mode (Homeotropic), the helical structure of the liquid crystal may be released, and the liquid crystal molecules may be aligned in the direction of the electric field. Accordingly, in the transmission mode, the liquid crystal layer 550 may transmit light. In detail, in the transmission mode, the liquid crystal layer 550 may transmit light provided from an upper or lower portion of the liquid crystal layer 550 in a lower or upper direction.

The liquid crystal layer 550 may have bistability. That is, the liquid crystal layer 550 may include bistable cholesteric liquid crystal. Accordingly, the liquid crystal layer 550 may operate in the reflection mode (Planar) or scattering mode (Focal Conic) even if power is not applied to the first electrode layer 510 and the second electrode layer 520 and may operate in the transmission mode (Homeotropic) when a set electric field is formed. In addition, in the transmission mode (homeotropic), the electric field formed in the liquid crystal layer 550 may be controlled to operate again in a reflection mode (Planar) or a scattering mode (Focal Conic).

The lighting device 1000 may further include a protective layer 600. The protective layer 600 may be disposed on the second resin layer 420. The protective layer 600 may include a light-transmitting material. In detail, the protective layer 600 may include a material through which light passing through the upper and lower surfaces is transmitted. That is, the protective layer 600 may be a light transmission layer. For example, the protective layer 600 may include at least one of PET (Polyethylene terephthalate), PS (Polystyrene), PI (Polyimide), PEN (Polyethylene naphthalate), PC (Poly carbonate).

The protective layer 600 has a set thickness and may protect components disposed below, such as the second resin layer 420 and the substrate 100. For example, the protective layer 600 may have a thickness of about 500 µm to about 3 mm. In detail, the protective layer 600 may have a thickness of about 800 µm to about 2.5 mm. When the thickness of the protective layer 600 is less than about 500 µm, it may be difficult to effectively protect elements disposed below due to the relatively thin thickness. Also, when the thickness of the protective layer 600 exceeds about 3 mm, the total thickness of the lighting device 1000 may increase and luminance may decrease. Also, when the thickness of the protective layer 600 exceeds about 3 mm, flexibility of the lighting device 1000 may be reduced due to the thickness. In this case, the structure and form to which the lighting device 1000 may be applied may be limited. Therefore, it is preferable that the thickness of the protective layer 600 satisfies the described range. Although not shown in the drawing, a third resin layer (not shown) may be further disposed between the protective layer 600 and the light-transmission control layer 500. The third resin layer is provided with a thickness smaller than that of the second resin layer 420 and may be provided as an adhesive layer for adhering the light-transmission control layer 500 and the protective layer 600. However, the embodiment is not limited thereto, and when at least one of the light-transmission control layers 500 and the protective layer 600 serves as an adhesive, the third resin layer may be omitted.

Figure 7:
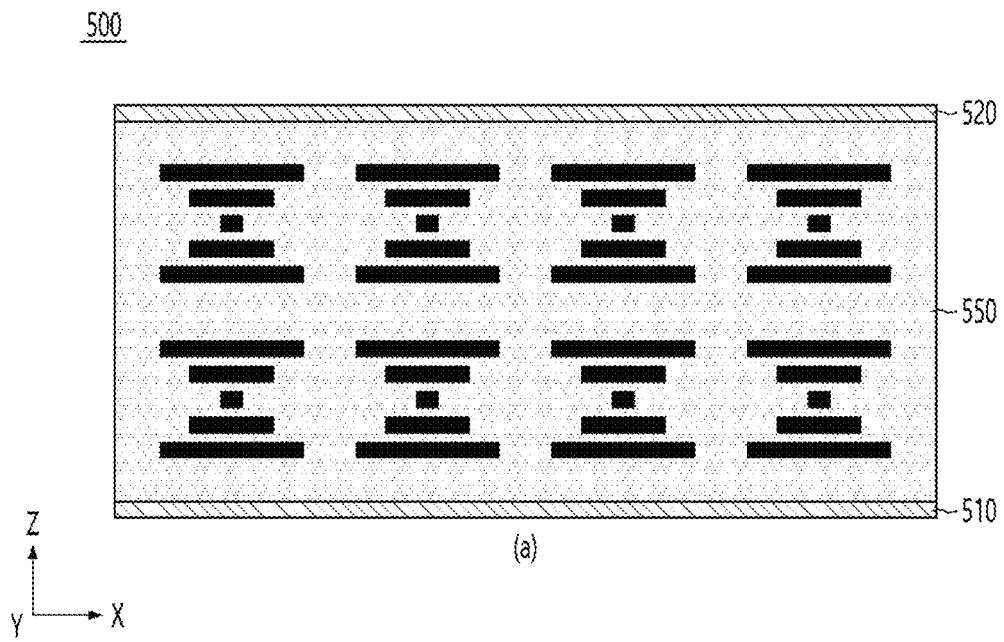
FIGS. 7 (a) to 9 (b) are diagrams for explaining an operation mode of a lighting device according to the embodiment.
Figure 7:
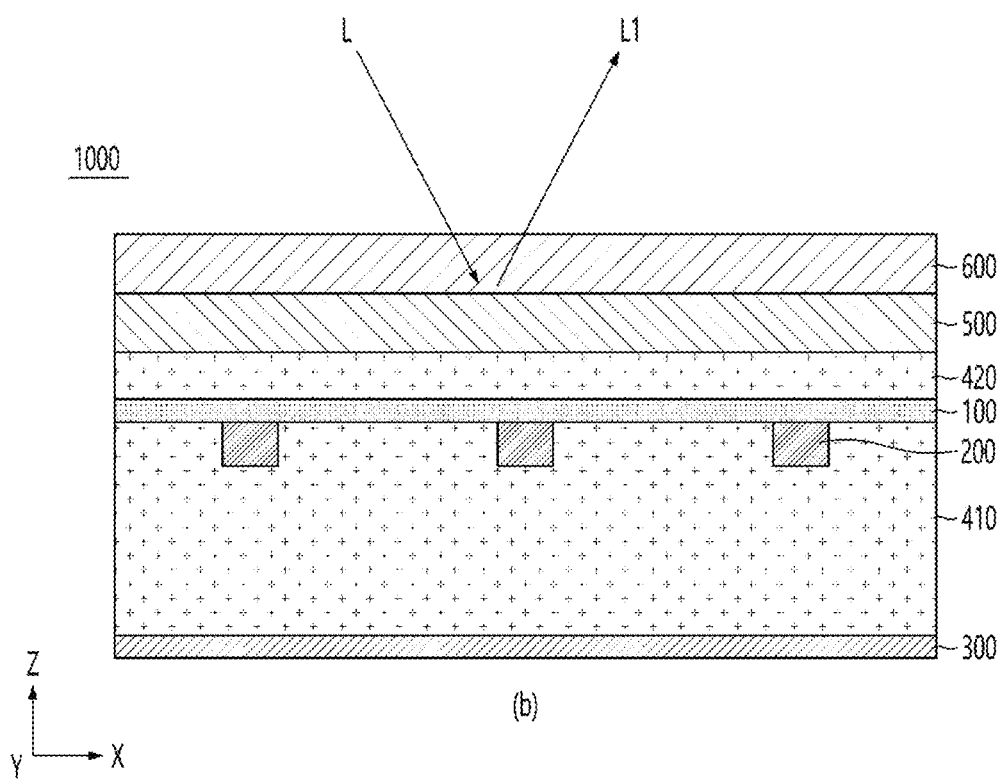
Figure 8:
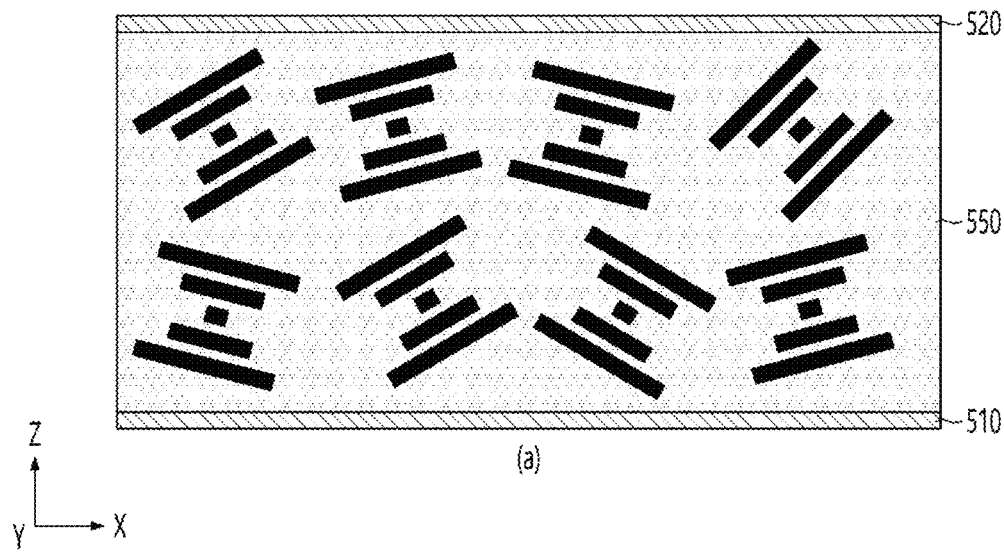
Figure 8:
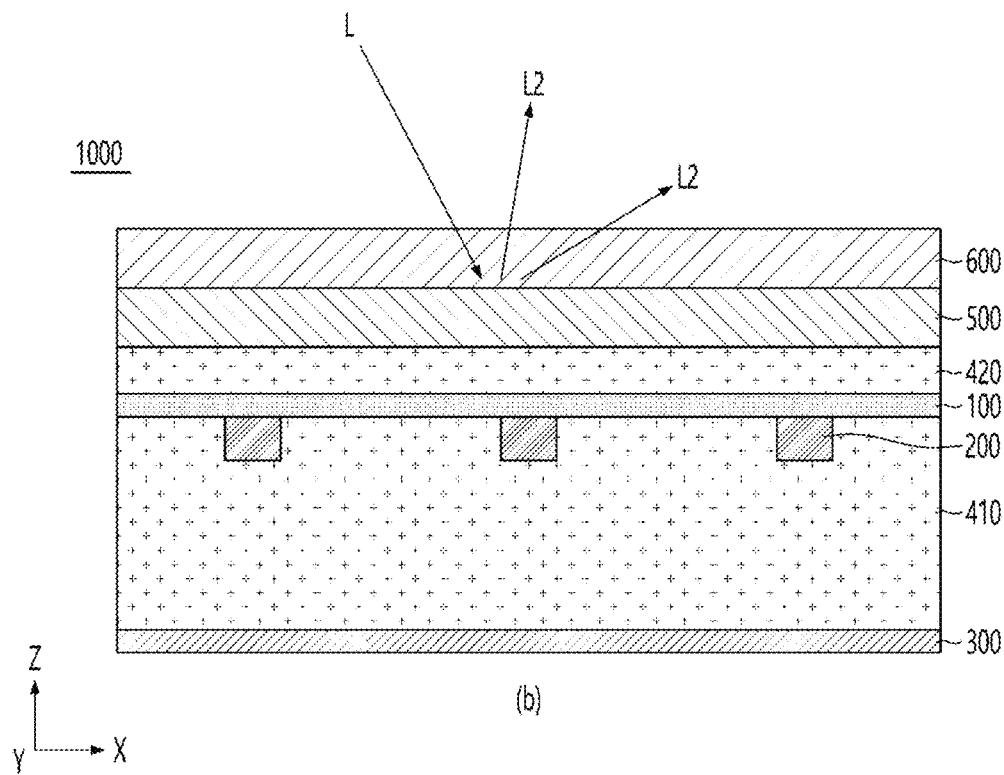
Figure 9:
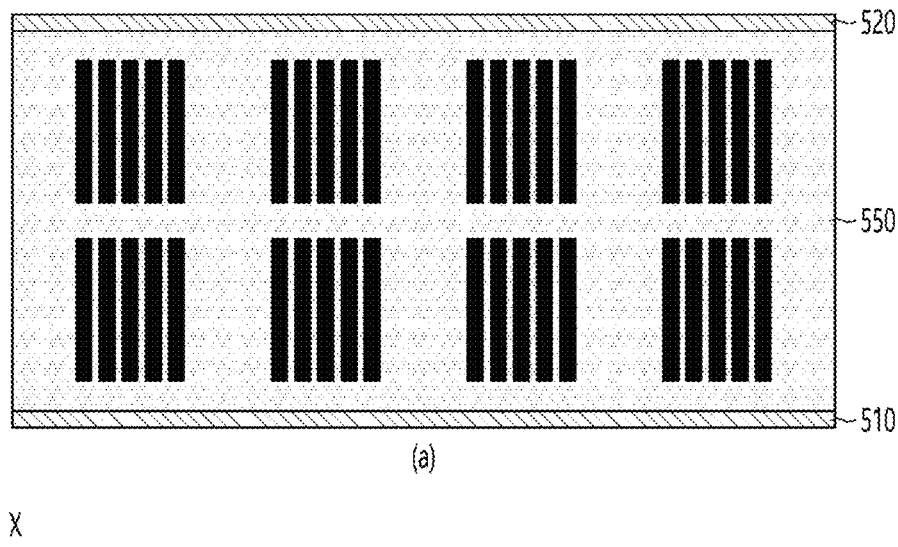
Figure 9:
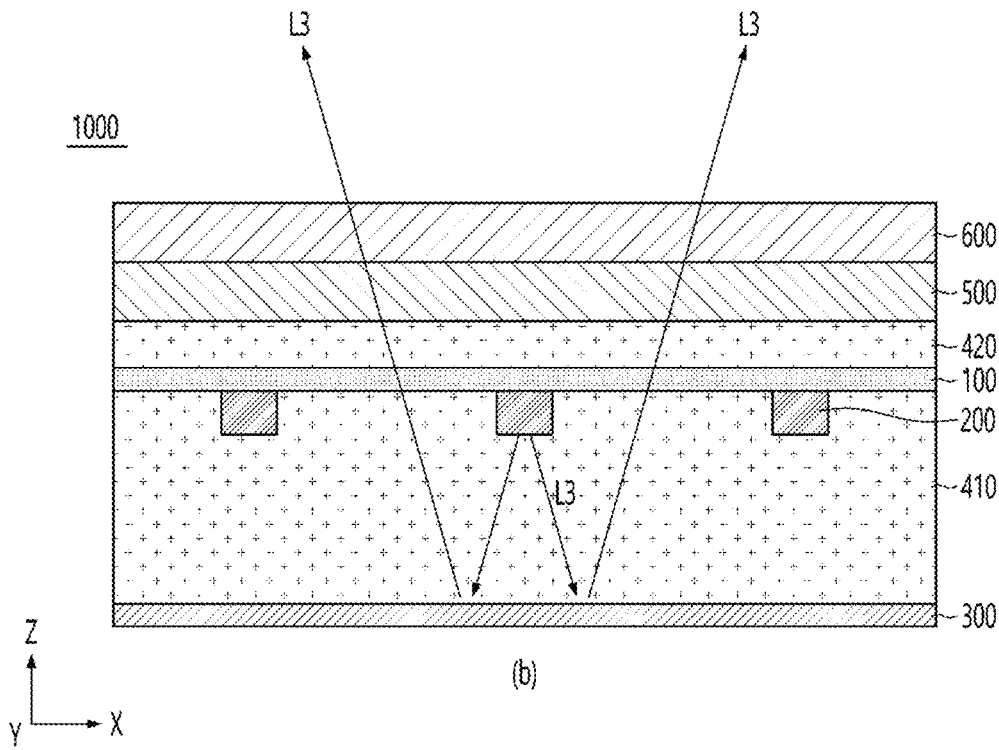

FIGS. 7 to 9 are diagrams for explaining an operation mode of a lighting device according to an embodiment. Referring to FIGS. 7 to 9, the lighting device 1000 according to the embodiment may operate in various modes by the light-transmission control layer 500. Referring to FIG. 7, the lighting device 1000 may operate in a reflection mode. The reflection mode may be a state in which power is not applied to the liquid crystal layer 550. That is, the reflection mode may be operated in a reflection mode (Planar) in which an electric field is not formed in the liquid crystal layer 550, and the spiral axis of the liquid crystal may be arranged perpendicular to or close to the first electrode layer 510 or the second electrode layer 520. Accordingly, when light L is incident on the light-transmission control layer 500 in the reflection mode, light LI having a wavelength according to a helical pitch of the liquid crystal may be reflected and provided. The reflection mode may be a mode in which light is not emitted from the light emitting device 200. That is, in this mode, light emitted from the light emitting device 200 may not pass through the liquid crystal layer 550 and thus the light emitting device 200 may not emit light.

Referring to FIG. 8, the lighting device 1000 may operate in a scattering mode. The scattering mode may be a state in which predetermined power is applied to the liquid crystal layer 550 or no power is applied. That is, the scattering mode may be a state of operating in a scattering mode (Focal Conic) in which a predetermined electric field is formed in the liquid crystal layer 550, and may be a state in which liquid crystals are randomly arranged. Accordingly, when light L is incident on the light-transmission control layer 500 in the scattering mode, light L scattered, diffracted, and diffracted by the liquid crystal layer 550 may be provided, and thus the light-transmission control layer 500 may be opaque from the outside. The scattering mode may be a mode in which light is not emitted from the light emitting device 200. That is, in this mode, the light emitted from the light emitting device 200 cannot effectively pass through the liquid crystal layer 550 and thus the light emitting device 200 may not emit light. Also, since the light-transmission control layer 500 is opaque, the light emitting device 200 may not be visually recognized from the outside. Alternatively, in the scattering mode, the light emitting device 200 may emit light. For example, during the daytime, light may be incident on the upper surface of the light-transmission control layer 500, and the light-transmission control layer 500 may be viewed opaquely by the light. However, in a dark environment such as at night, light may not be incident on the upper surface of the light-transmission control layer 500. In this case, the light emitting device 200 may emit light, and the light-transmission control layer 500 may be visually recognized as opaque from the outside by the light L3 emitted from the light emitting device 200.

Referring to FIG. 9, the lighting device 1000 may operate in a transmission mode. The transmission mode may be a state in which power is applied to the liquid crystal layer 550. That is, the transmission mode may be a homeotropic operation in which a set electric field is formed in the liquid crystal layer 550, and liquid crystal molecules may be aligned in the direction of the electric field. Accordingly, when light L is incident on the light-transmission control layer 500 in the transmission mode, the light L may pass through the light-transmission control layer 500 and may be incident in the direction of the second resin layer 420. The transmission mode may be a mode in which light is emitted from the light emitting device 200. That is, in the mode, the light L3 emitted from the light emitting device 200 may be reflected by the reflective layer 300 and provided to the first resin layer 410 and the second resin layer 420, and may pass through the light-transmission control layer 500. Accordingly, the light L3 emitted from the light emitting device 200 may be viewed from the outside. That is, the lighting device 1000 may control the arrangement of liquid crystals by controlling an electric field formed in the liquid crystal layer 550, and may reflect, scatter, diffract, or diffusely reflect the light incident on the lighting device 1000, or light emitted from the light emitting device 200 may be selectively transmitted. Accordingly, the lighting device 1000 according to the embodiment may emit light of a set wavelength when operating, and may have a set color when not operating.

Figure 10:
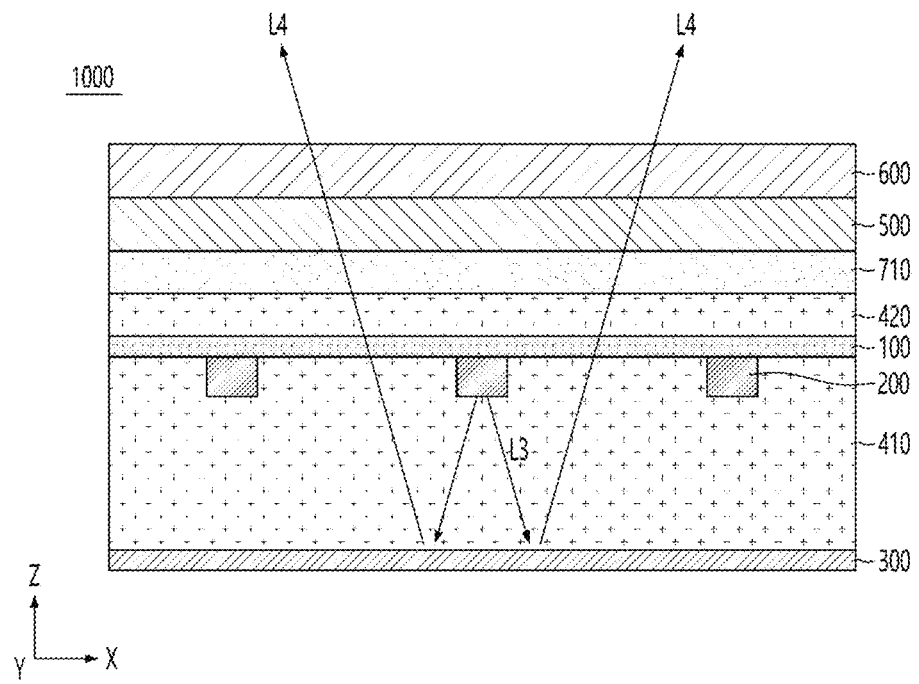
FIG. 10 is a cross-sectional view of a lighting device according to the embodiment including a wavelength conversion layer.

FIG. 10 is a cross-sectional view of a lighting device including a wavelength conversion layer according to an embodiment. In the description using FIG. 10, the same reference numerals are given to the same and similar components as those of the above-described lighting device and the same or similar configurations are omitted.

Referring to FIG. 10, a lighting device 1000 according to an embodiment may include a wavelength conversion layer 710. The wavelength conversion layer 710 may be disposed on the substrate 100. In detail, the wavelength conversion layer 710 may be disposed on an upper surface opposite to the lower surface of the substrate 100 on which the light emitting device 200 is disposed. The wavelength conversion layer 710 may be disposed on the second resin layer 420. The wavelength conversion layer 710 may be disposed between the second resin layer 420 and the light-transmission control layer 500.

The wavelength conversion layer 710 may include a wavelength conversion material. For example, the wavelength conversion layer 710 may include at least one wavelength conversion material selected from a phosphor and a quantum dot. For example, the wavelength conversion layer 710 includes a phosphor and may emit white, blue, yellow, green, or red light. The phosphor may include at least one or two types of a green phosphor, a red phosphor, an amber phosphor, a yellow phosphor, a white phosphor, and a blue phosphor. The phosphor may include at least one of YAG-based, TAG-based, silicate-based, sulfide-based, and nitride-based. The wavelength conversion layer 710 may absorb the light L3 emitted from the light emitting device 200 and convert it into light LA of a different wavelength band from the light L3. In detail, the wavelength conversion layer 710 may absorb some light L3 emitted from the light emitting device 200 and/or light L3 emitted from the light emitting device 200 and reflected by the reflective layer 300 and convert it into light L4 of another wavelength band.

The wavelength conversion layer 710 may have a set thickness. In detail, the wavelength conversion layer 710 may have a thickness smaller than that of the first resin layer 410. For example, the wavelength conversion layer 710 may have a thickness of about 50 μm to about 500 μm. In detail, the wavelength conversion layer 710 may have a thickness of about 80 μm to about 400 μm. When the thickness of the wavelength conversion layer 710 is less than about 50 μm, it may be difficult to convert the first light emitted from the light emitting device 200 into the second light of a set wavelength band. In addition, when the thickness of the wavelength conversion layer 710 is less than about 50 μm, the color of the wavelength conversion layer 710 may not be clearly visible while the lighting device 1000 is off, and the internal configuration of the lighting device 1000 may be visible from the outside. In addition, when the thickness of the wavelength conversion layer 710 exceeds about 500 μm, the first light emitted from the light emitting device 200 may be effectively converted into the second light, but the thickness of the wavelength conversion layer 710 may be relatively thick. Accordingly, the total thickness of the lighting device 1000 may be increased to decrease flexibility, and the light emitted from the light emitting device 200 may be lost in the process of passing through the wavelength conversion layer 710, thereby decreasing the overall luminance. Accordingly, when the light-transmission control layer 500 operates in a transmission mode, the light L3 emitted from the light emitting device 200 may pass through the wavelength conversion layer 710 to provide light L4 in a different wavelength band from the light emitting device 200.

Figure 11:
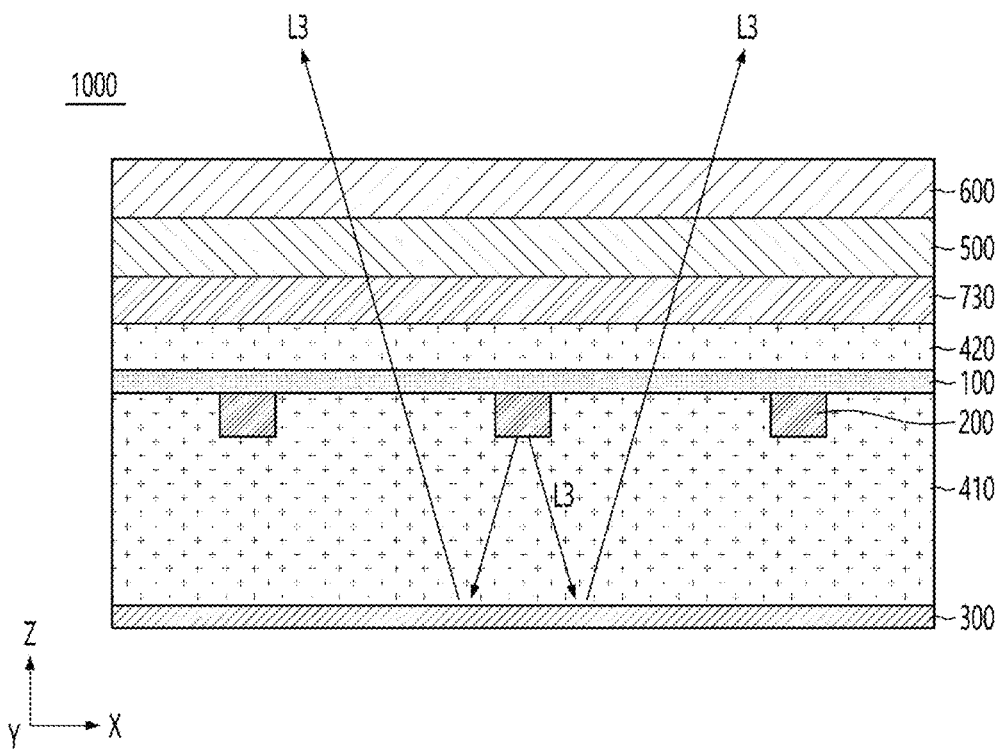
FIG. 11 is a cross-sectional view of a lighting device according to the embodiment including a light blocking sheet.
Figure 12:
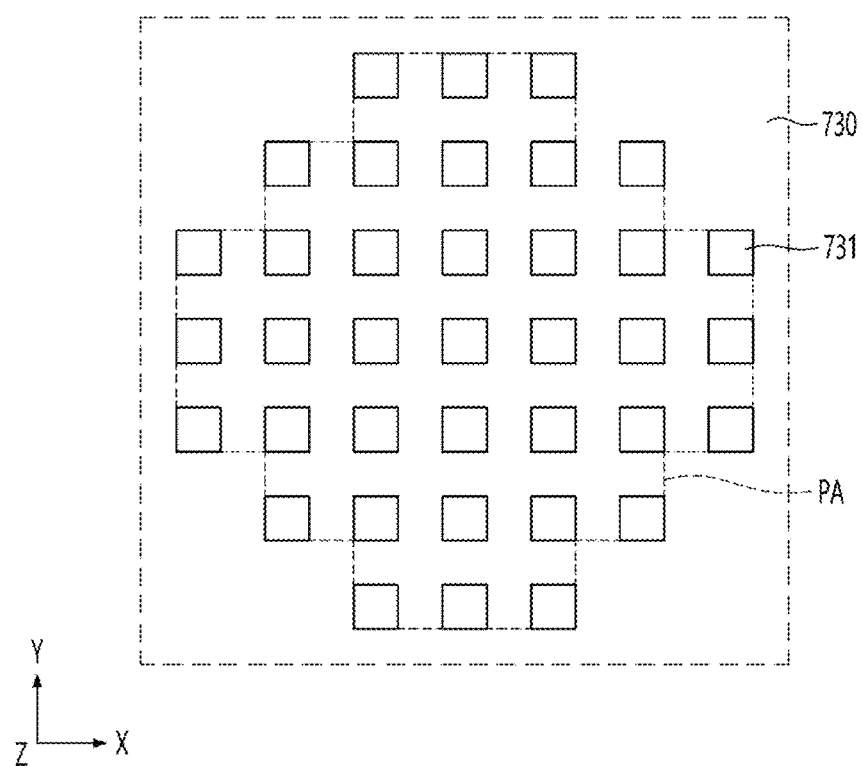
FIG. 12 is a plan view of a light blocking sheet according to an embodiment.

FIG. 11 is a cross-sectional view of a lighting device including a light blocking sheet according to an embodiment, and FIG. 12 is a plan view of the light blocking sheet according to an embodiment. In the description using FIGS. 11 and 12, the same reference numerals are assigned to the same and similar components, and the same or similar configurations to those of the above-described lighting device are omitted.

Referring to FIGS. 11 and 12, the lighting device 1000 according to the embodiment may include a light blocking sheet 730. The light blocking sheet 730 may be disposed on an upper surface of the substrate 100. The light blocking sheet 730 may be disposed on the second resin layer 420. The light blocking sheet 730 may be disposed between the second resin layer 420 and the light-transmission control layer 500. The light blocking sheet 730 may include a light-transmitting material. For example, the light blocking sheet 730 may include at least one of PET (Polyethylene terephthalate), PS (Polystyrene), PI (Polyimide), PEN (Polyethylene naphthalate), and PC (Poly carbonate). A region of the light blocking sheet 730 other than the light blocking pattern 731 to be described later may be a light transmission layer. The light blocking sheet 730 may include a plurality of light blocking patterns 731 spaced apart from each other in the first and second directions. The plurality of light blocking patterns 731 may be formed on at least one of a lower surface facing the second resin layer 420 and an upper surface facing the protective layer 600. The light blocking pattern 731 may block light emitted through the substrate 100. The light blocking pattern 731 may include ink. For example, the light blocking pattern 731 may be printed with a material including any one of $TiO_2$, $CaCO_3$, $BaSO_4$, $Al_2O_3$, Silicon, and PS. The light blocking pattern 731 may be white with excellent reflective properties. In addition, the light blocking pattern 731 may be provided in the form of a concave groove on the upper or lower surface of the light blocking sheet 730. For example, when the light blocking pattern 731 is formed on the upper surface of the light blocking sheet 730, the light blocking pattern 731 may be provided in a concave groove shape from the upper surface to the lower surface of the light blocking sheet 730.

The plurality of light blocking patterns 731 may be disposed in a region corresponding to the light emitting device 200. In detail, a portion of the light blocking pattern 731 may be disposed in a region overlapping the light emitting device 200 in a vertical direction. Also, some of the plurality of light blocking patterns 731 may overlap the first pattern region P1 in a vertical direction. Also, some of the plurality of light blocking patterns 731 may overlap the reflective pattern 310 in a vertical direction. Densities of the plurality of light blocking patterns 731 may change as the distance from the region corresponding to the light emitting device 200 increases. For example, the density of the plurality of light blocking patterns 731 may decrease as the distance from the region overlapping the optical axis of the light emitting device 200 in the light blocking sheet 730 increases. In addition, the size of each of the plurality of light blocking patterns 731 may decrease as the distance from the region overlapping the optical axis of the light emitting device 200 increases. The plurality of light blocking patterns 731 may have a set shape. For example, when viewing the light blocking pattern 731 from above, the light blocking pattern 731 may have various shapes such as a polygonal shape, a circular shape, and an elliptical shape. Also, the light blocking region PA formed by the plurality of light blocking patterns 731 may have a polygonal shape close to a circle, a circular shape, or an elliptical shape as shown in FIG. 12.

The light blocking region PA formed by the plurality of light blocking patterns 731 may have a set area. For example, the area of the light blocking region PA may be larger than an area of the lower surface of the light emitting device 200. Also, the area of the light blocking region PA may be larger than that of the first pattern region P1. For example, the area of the light blocking region PA may be about 5 times to about 20 times the area of the lower surface of the light emitting device 200. In detail, the area of the light blocking region PA may be about 8 times to about 15 times the area of the lower surface of the light emitting device 200. When the area of the light blocking region PA formed by the plurality of light blocking patterns 731 is less than about 5 times the area of the lower surface of the light emitting device 200, it may be difficult to prevent hot spots from forming by light passing through the electrode layers 110 and 120 and the substrate 100. In addition, when the area of the light-shielding region PA exceeds about 20 times the area of the lower surface of the light emitting device 200, hot spots may be prevented from being formed by light passing through the electrode layers 110 and 120 and the substrate 100, but the overall brightness of the lighting device 1000 may be reduced by the light blocking pattern 731. Accordingly, it is preferable that the light blocking region PA formed by the plurality of light blocking patterns 731 satisfy the aforementioned range.

Figure 13:
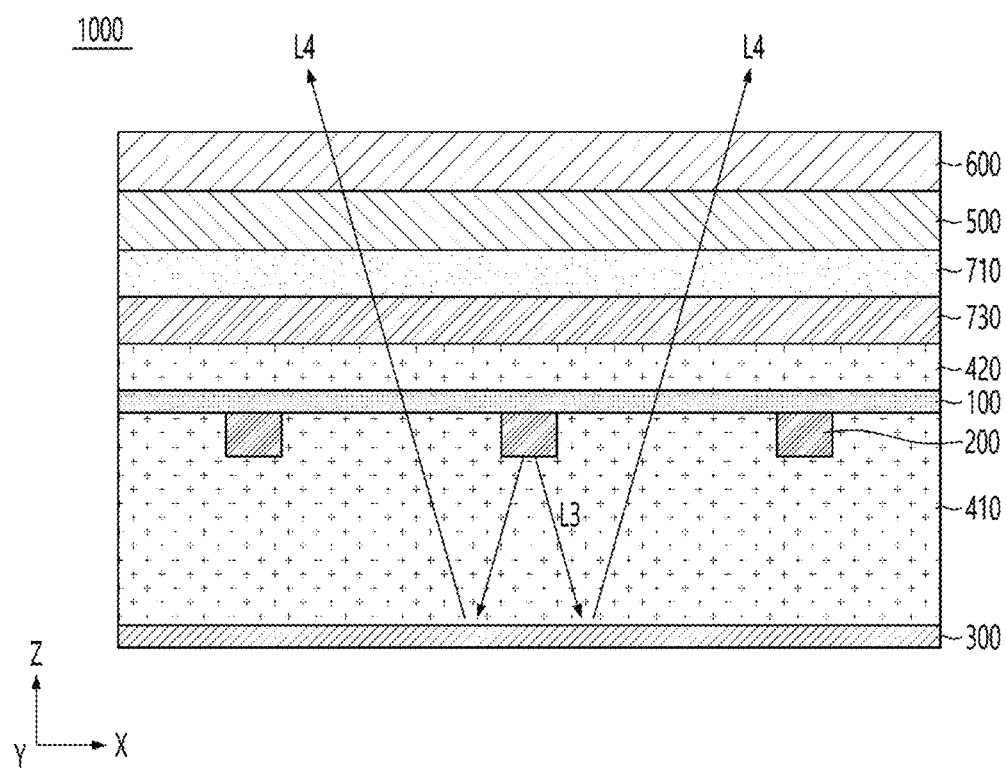
FIG. 13 is a cross-sectional view of a lighting device according to the embodiment including a wavelength conversion layer and a light blocking sheet.

FIG. 13 is a cross-sectional view of a lighting device according to an embodiment including a wavelength conversion layer and a light blocking sheet. In the description using FIG. 13, the same reference numerals are given to the same and similar components as those of the above-described lighting device and the description is omitted. Referring to FIG. 13, the lighting device 1000 according to the embodiment may include the aforementioned wavelength conversion layer 710 and the light blocking sheet 730. In this case, the light blocking sheet 730 may be disposed between the second resin layer 420 and the light-transmission control layer 500. In addition, the wavelength conversion layer 710 may be disposed between the light blocking sheet 730 and the light-transmission control layer 500.

Figure 14:
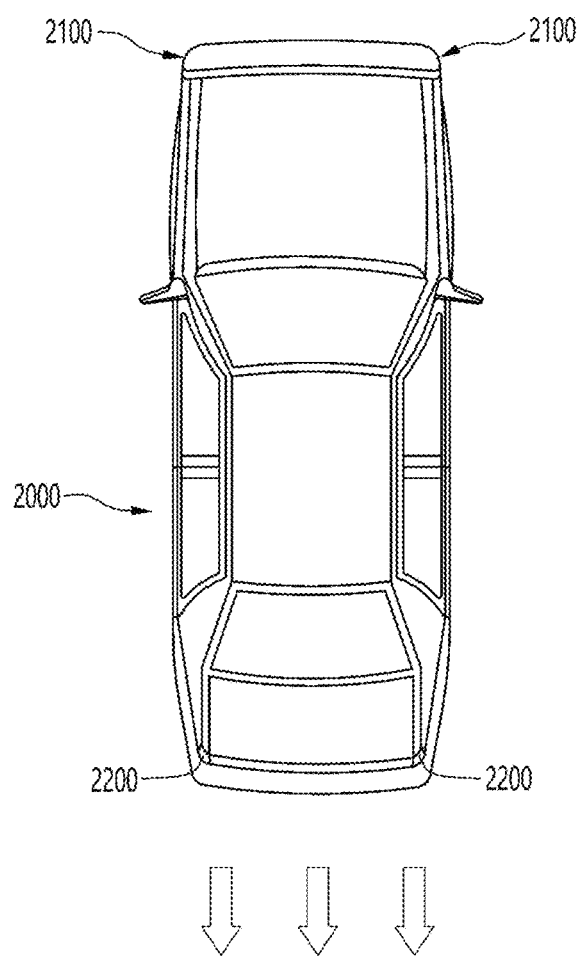
FIGS. 14 to 18 are views illustrating examples in which a lamp including a lighting device according to the embodiment is applied to a vehicle.
Figure 15:
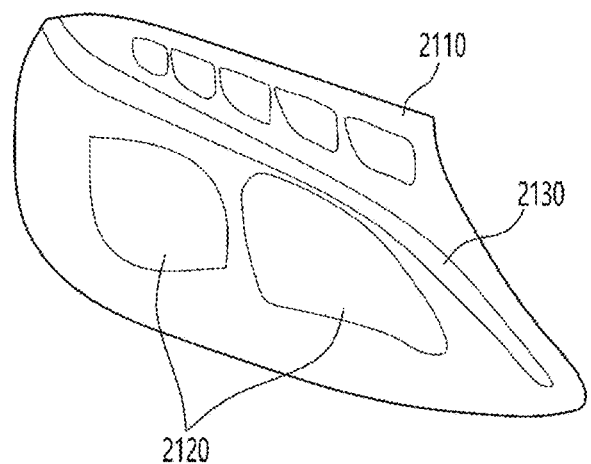
Figure 16:
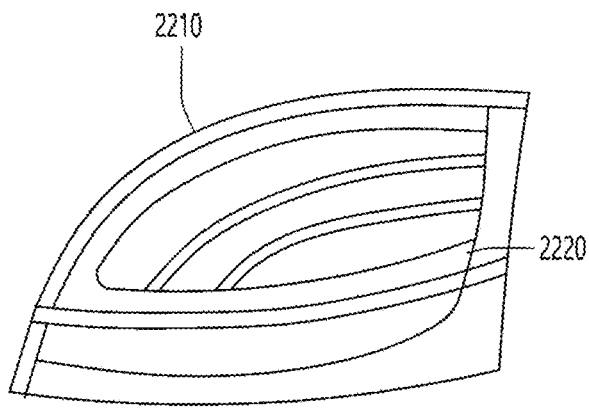

FIGS. 14 to 18 are diagrams illustrating examples in which a lamp including a lighting device according to an embodiment is applied to a moving device, for example, a vehicle. In detail, FIG. 14 is a top view of a vehicle to which a lamp having the lighting device is applied. Also, FIG. 15 is an example in which a lighting device according to an embodiment is disposed in front of a vehicle, and FIG. 16 is an example in which a lighting device according to an embodiment is disposed in the rear of a vehicle. 17 and 18 are examples for explaining that the lighting device according to the embodiment operates as a hidden lamp in front of the vehicle.

Referring to FIGS. 14 to 18, a lighting device 1000 according to an embodiment may be applied to a lamp of a vehicle 2000. One or more lamps may be disposed at least one of the front, rear, and side surfaces of the vehicle 2000. The lighting device 1000 is provided in various shapes such as a curve or a straight line, and may be applied to lamps disposed in various areas of the vehicle 2000. For example, referring to FIG. 15, the lamp may be applied to a front lamp 2100 of a vehicle 2000. The front lamp 2100 may include at least one lamp module including the first cover member 2110 and the lighting device 1000. The first cover member 2110 may accommodate the lighting device 1000.

The front lamp 2100 may provide a plurality of functions by controlling the driving timing of the lighting device 1000 included in at least one lamp module. For example, the front lamp 2100 may include a first lamp module 2120 and a third lamp module 2130 that provide at least one of headlamps, a direction indicator, a daytime running lamp, an up lamp, a down lamp, and a fog lamp by the light emission of the lighting device 1000. In addition, the front lamp 2100 may provide additional functions such as a welcome light or a celebration effect when the driver opens the vehicle door.

Referring to FIG. 16, the lamp may be applied to a rear lamp 2200 of a vehicle. The rear lamp 2200 may include at least one lamp module including the second cover member 2210 and the lighting device 1000. The second cover member 2210 may accommodate the lighting device 1000. The rear lamp 2200 may provide a plurality of functions by controlling the driving timing of the lighting device 1000 included in at least one lamp module. For example, the rear lamp 2200 may include a second lamp module 2220 that provides at least one function of a sidelight, a brake light, and a direction indicator light by light emitted from the lighting device 1000. At this time, the lamp module included in at least one of the front lamps 2100 and the rear lamp 2200 may be provided in a color set according to on or off.

Figure 17:
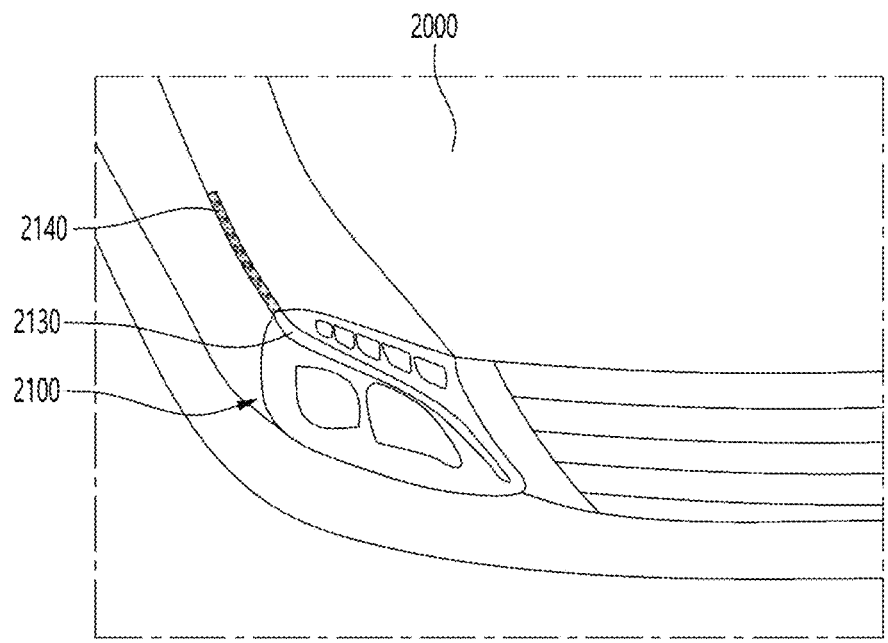
Figure 18:
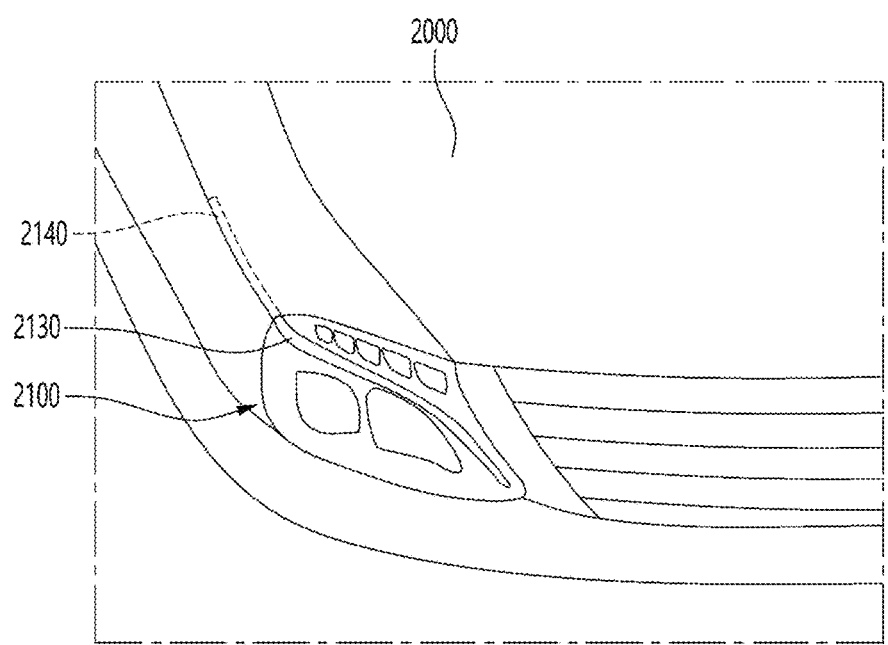

For example, referring to FIGS. 17 and 18, the front lamp 2100 may further include a fourth lamp module 2140. The lighting device 1000 included in the fourth lamp module 2140 may include a light-transmission control layer 500 including a liquid crystal layer 550. In this case, the liquid crystal layer 550 may include bistable cholesteric liquid crystal having a helical pitch corresponding to the color of the vehicle 2000. The fourth lamp module 2140 may emit light or not emit light depending on the applied power. For example, as shown in FIG. 17, the fourth lamp module 2140 may operate in an on state to emit light from the light emitting device 200. In this case, the light-transmission control layer 500 may operate in a homeotropic mode by forming an electric field set in the liquid crystal layer 550, and light emitted from the light emitting device 200 may pass through the light-transmission control layer 500 and be visible outside the fourth lamp module 2140. For example, the fourth lamp module 2140 can provide a function of a direction indicator lamp by emitting light of an amber color.

As shown in FIG. 18, the fourth lamp module 2140 may be in an off state in which the light emitting device 200 does not emit light. In this case, the light-transmission control layer 500 may operate in a reflection mode (Planar) by removing an electric field formed in the liquid crystal layer 550. Accordingly, the fourth lamp module 2140 may reflect light of a wavelength corresponding to the spiral pitch of the liquid crystal, for example, light of a wavelength band corresponding to the color of the vehicle 2000, and thus may have a color similar to that of the vehicle 2000. That is, in the embodiment, when the fourth lamp module 2140 is turned on, it is possible to provide excellent light with high luminance and low luminance deviation. In addition, when the fourth lamp module 2140 is turned off, the fourth lamp module 2140 may have a hidden effect of minimizing not being visible or visible from the outside, thereby having improved aesthetics and design freedom.

Features, structures, effects, etc. described in the embodiments above are included in at least one embodiment of the present invention, and are not necessarily limited to only one embodiment. Furthermore, the features, structures, and effects illustrated in each embodiment can be combined or modified with respect to other embodiments by those skilled in the art in the field to which the embodiments belong. Therefore, contents related to these combinations and variations should be construed as being included in the scope of the present invention. Although described based on the embodiments, this is only an example, this invention is not limited, and it will be apparent to those skilled in the art that various modifications and applications not illustrated above are possible without departing from the essential characteristics of this embodiment. For example, each component specifically shown in the embodiment can be modified and implemented. And the differences related to these modifications and applications should be construed as being included in the scope of the present invention as defined in the appended claims.

The invention claimed is:

1. A lighting device comprising:
   a reflective layer including a plurality of reflective patterns;
   a substrate;
   a light emitting device electrically connected to the substrate; and
   a first resin layer disposed on the reflective layer and covering the light emitting device,
   wherein a portion of the first resin layer is disposed between the light emitting device and the plurality of reflective patterns of the reflective layer,
   wherein the substrate includes a first electrode and a second electrode electrically connected to the light emitting device, and a first opening region disposed between the first electrode and the second electrode.

2. The lighting device of claim 1, wherein the first electrode includes a first pad and first electrode wires connected to the first pad,
   wherein the second electrode includes a second pad and second electrode wires connected to the second pad,
   wherein the light emitting device is disposed on the first and second pads of the substrate and electrically connected to the first and second pads, and
   wherein the first and second pads are spaced apart from each other on the substrate in a first direction.

3. The lighting device of claim 2, wherein the plurality of first electrode wires is spaced apart by a first interval in the first direction, and
   wherein the first interval is 450 μm or less.

4. The lighting device of claim 2, wherein the plurality of first electrode wires is spaced apart by a second interval in a second direction orthogonal to the first direction, and
   wherein the second interval is 450 μm or less.

5. The lighting device of claim 2, wherein the substrate includes a plurality of second opening regions disposed between the first electrode wires.

6. The lighting device of claim 5, wherein the second opening regions are arranged in the first direction and a second direction orthogonal to the first direction.

7. The lighting device of claim 2, wherein the first opening region is disposed between the first pad and the second pad, and disposed between the first electrode wires and the second electrode wires.

8. The lighting device of claim 2, wherein the plurality of second electrode wires is spaced apart by a third interval in the first direction and in a second direction orthogonal to the first direction.

9. The lighting device of claim 8, wherein the substrate includes a plurality of third opening regions disposed between the second electrode wires, and arranged in a first direction and a second direction orthogonal to the first direction, and
   wherein the third interval is 450 μm or less.

10. The lighting device of claim 2, wherein the substrate includes a material through which light is transmitted through upper and lower surfaces of the substrate.

11. The lighting device of claim 1, wherein the first resin layer has a thickness of 5 mm or less and is thicker than a thickness of the light emitting device.

12. The lighting device of claim 11, wherein the first resin layer is in contact with a surface of the light emitting device.

13. The lighting device of claim 12, wherein the plurality of reflective patterns is in contact the first resin layer.

14. The lighting device of claim 12, further comprising:
   a second resin layer disposed on the first resin layer and having beads therein.

15. The lighting device of claim 14, further comprising: a wavelength conversion layer disposed on the second resin layer.

16. The lighting device of claim 14, further comprising: a light blocking sheet disposed on the second resin layer.

17. The lighting device of claim 16, wherein the light blocking sheet includes a plurality of light blocking patterns,
   wherein the light emitting device overlaps a portion of the plurality of light blocking patterns in a vertical direction, and
   wherein the vertical direction is a direction from the reflective layer toward the light emitting device.

18. The lighting device of claim 17, wherein a density of the plurality of light blocking patterns decreases as a distance from a region overlapping the light emitting device in the vertical direction increases.

19. The lighting device of claim 17, wherein an area of a region in which the plurality of light blocking patterns are formed is 5 to 20 times an area of a lower surface of the light emitting device.

20. The lighting device of claim 14, further comprising: a light blocking sheet disposed on the second resin layer and a wavelength conversion layer disposed on the light blocking sheet.

* * * * *